US012647197B2

(12) United States Patent
Li et al.

(10) Patent No.: US 12,647,197 B2
(45) Date of Patent: Jun. 2, 2026

(54) OUTER RING VALUE DETERMINATION METHOD AND APPARATUS, AND DEVICE AND STORAGE MEDIUM

(71) Applicant: ZTE CORPORATION, Shenzhen (CN)

(72) Inventors: Jianguo Li, Shenzhen (CN); Qiaoyan Liu, Shenzhen (CN); Ke Shi, Shenzhen (CN); Zepeng Ma, Shenzhen (CN); Dawei Lu, Shenzhen (CN); Mengxi Zhuang, Shenzhen (CN); Miao Fan, Shenzhen (CN); Shengnan Sun, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 545 days.

(21) Appl. No.: 18/002,920

(22) PCT Filed: Jun. 16, 2021

(86) PCT No.: PCT/CN2021/100443
§ 371 (c)(1),
(2) Date: Dec. 22, 2022

(87) PCT Pub. No.: WO2021/259114
PCT Pub. Date: Dec. 30, 2021

(65) Prior Publication Data
US 2023/0246729 A1      Aug. 3, 2023

(30) Foreign Application Priority Data
Jun. 24, 2020     (CN) .......................... 202010591941.2

(51) Int. Cl.
*H04L 1/00*          (2006.01)
*H04B 17/336*     (2015.01)
*H04L 1/20*          (2006.01)

(52) U.S. Cl.
CPC ......... *H04L 1/0003* (2013.01); *H04B 17/336* (2015.01); *H04L 1/203* (2013.01)

(58) Field of Classification Search
CPC ...... H04L 1/0003; H04L 1/203; H04B 17/336
(Continued)

(56) References Cited

U.S. PATENT DOCUMENTS

2003/0204615 A1     10/2003   Wei et al.
2013/0182569 A1       7/2013   Bertrand et al.
(Continued)

FOREIGN PATENT DOCUMENTS

CN          1659800 A        8/2005
CN          1805301 A        7/2006
(Continued)

OTHER PUBLICATIONS

3GPP Technical Specification Group Radio Access Network. "NR UE performance Ad-hoc minutes," 3GPP TSG-RAN WG4 Ad-hoc Meeting, Jul. 2018, pp. 1-34.
(Continued)

*Primary Examiner* — Asad M Nawaz
*Assistant Examiner* — Hugh Mark Ashley
(74) *Attorney, Agent, or Firm* — Vivacqua Crane, PLLC

(57) ABSTRACT

A method and apparatus for determining an outer loop value, a device, and a storage medium are disclosed. The method may include: determining a pre-trained outer loop initialization model based on current feature data of a user equipment (S11); and determining an initialized outer loop value of the user equipment based on a current air interface measurement value of the user equipment and the outer loop initialization model (S12).

17 Claims, 8 Drawing Sheets determine a pre-trained outer loop initialization model based on current feature data of a user equipment    S11 determine an initialized outer loop value of the user equipment based on a current air interface measurement value of the user equipment and the outer loop initialization model    S12

(58) Field of Classification Search
USPC ........................................................ 370/328
See application file for complete search history.

(56) References Cited

U.S. PATENT DOCUMENTS

| | | | |
|---|---|---|---|
| 2014/0369283 A1 | 12/2014 | Ge et al. | |
| 2015/0117321 A1 | 4/2015 | Chen et al. | |
| 2016/0157118 A1 | 6/2016 | Liu et al. | |
| 2016/0261365 A1* | 9/2016 | Chen ..................... | H04W 72/23 |
| 2018/0359048 A1 | 12/2018 | Stephenne | |
| 2019/0297630 A1 | 9/2019 | Chen et al. | |
| 2019/0349789 A1 | 11/2019 | Zeng et al. | |

FOREIGN PATENT DOCUMENTS

| | | | | | |
|---|---|---|---|---|---|
| CN | 101534176 | A | 9/2009 | | |
| CN | 103516463 | A | 1/2014 | | |
| CN | 105519030 | A | 4/2016 | | |
| CN | 105577324 | A | 5/2016 | | |
| CN | 109412996 | A | 3/2019 | | |
| CN | 110050425 | A | 7/2019 | | |
| EP | 3557793 | B1 * | 12/2020 | .............. | H04L 1/00 |
| JP | 2016500494 | A | 1/2016 | | |
| WO | 2012135751 | A1 | 10/2012 | | |
| WO | WO-2015165515 | A1 * | 11/2015 | .......... | H04L 1/0693 |
| WO | 2016075517 | A1 | 5/2016 | | |
| WO | 2018037204 | A1 | 3/2018 | | |
| WO | 2018137204 | A1 | 8/2018 | | |

OTHER PUBLICATIONS

Chen, B., et al. "Adaptive Two-Loop Power Tracking Control in CDMA Systems with the Utility Optimization," IEEE Transactions on Wireless Communications, vol. 7, No. 4, Apr. 2008, pp. 1358-1368.

European Patent Office. Extended European Search Report for EP Application No. 21829532.7, mailed Mar. 13, 2024, pp. 1-20.

Intellectual Property India. Examination Report for IN Application No. 202327004136 and English translation, mailed Mar. 1, 2024, pp. 1-6.

Rui, X., et al. "Weighted SNR estimation algorithm based on 16APSK in Nakagami channel," Systems Engineering and Electronics, vol. 40, No. 4, Apr. 2018, pp. 891-897.

The State Intellectual Property Office of People's Republic of China. First Office Action for CN Application No. 202010591941.2 and English translation, mailed Mar. 27, 2024, pp. 1-8.

The State Intellectual Property Office of People's Republic of China. First Search Report for CN Application No. 202010591941.2 and English translation, mailed Mar. 26, 2024, pp. 1-10.

Wang, T. "Research and Implementation on TD-LTE System Downlink Link Adaptation," Master's Thesis, Beijing University of Posts and Telecommunications, Jan. 2012, pp. 1-72.

Wang, Z., et al. "HS-SCCH outer-loop power control algorithm based on dynamic threshold," China New Telecommunications, Technical Edition, No. 17, Sep. 2007, pp. 33-36.

European Patent Office. Partial Supplementary European Search Report for EP Application No. 21829532.7, mailed Nov. 17, 2023, pp. 1-15.

3GPP Technical Specification Group Radio Access Network. "LLS evaluations and observations in uRLLC," 3GPP TSG RAN WG1 Meeting #95, Nov. 2018, pp. 1-9.

International Searching Authority. International Search Report and Written Opinion for PCT Application No. PCT/CN2021/100443 and English translation, mailed Sep. 15, 2021, pp. 1-9.

Korean Intellectual Property Office. First Office Action for KR Application No. 10-2022-7045932 and English translation, mailed Oct. 23, 2025, pp. 1-10.

* cited by examiner

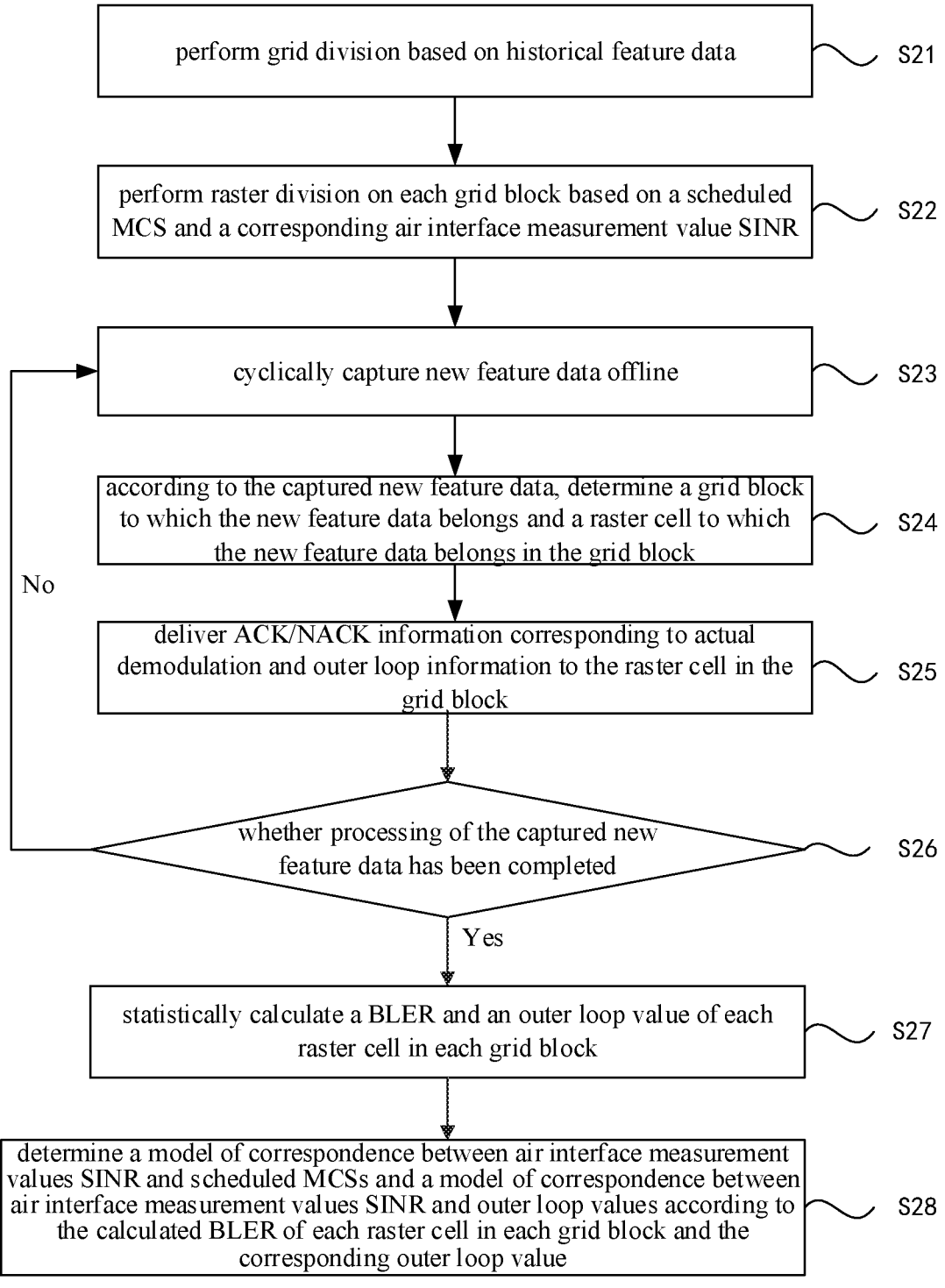

perform grid division based on historical feature data — S21 perform raster division on each grid block based on a scheduled MCS and a corresponding air interface measurement value SINR — S22 cyclically capture new feature data offline — S23 according to the captured new feature data, determine a grid block to which the new feature data belongs and a raster cell to which the new feature data belongs in the grid block — S24 deliver ACK/NACK information corresponding to actual demodulation and outer loop information to the raster cell in the grid block — S25

No whether processing of the captured new feature data has been completed — S26

Yes statistically calculate a BLER and an outer loop value of each raster cell in each grid block — S27 determine a model of correspondence between air interface measurement values SINR and scheduled MCSs and a model of correspondence between air interface measurement values SINR and outer loop values according to the calculated BLER of each raster cell in each grid block and the corresponding outer loop value — S28

Fig. 2

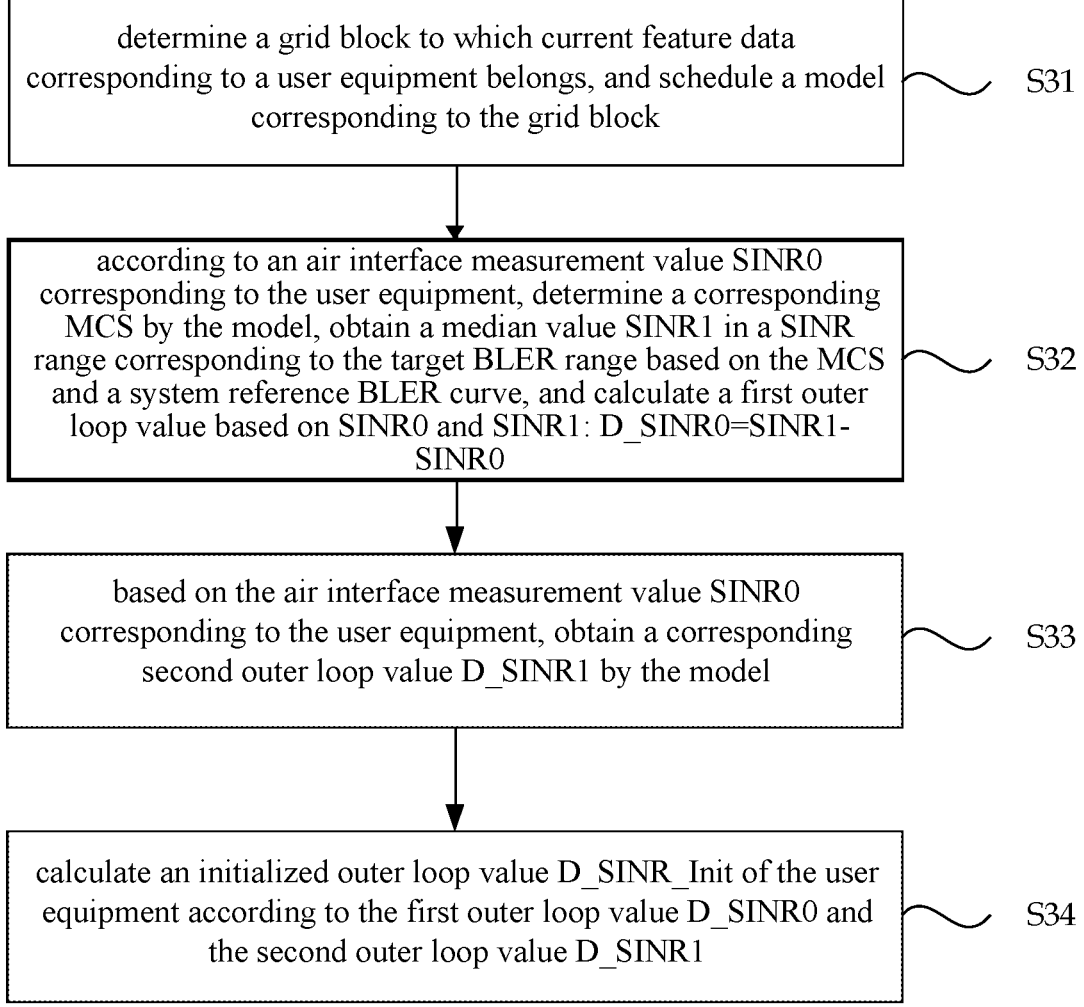

determine a grid block to which current feature data corresponding to a user equipment belongs, and schedule a model corresponding to the grid block                    S31 according to an air interface measurement value SINR0 corresponding to the user equipment, determine a corresponding MCS by the model, obtain a median value SINR1 in a SINR range corresponding to the target BLER range based on the MCS and a system reference BLER curve, and calculate a first outer loop value based on SINR0 and SINR1: D_SINR0=SINR1-SINR0                    S32 based on the air interface measurement value SINR0 corresponding to the user equipment, obtain a corresponding second outer loop value D_SINR1 by the model                    S33 calculate an initialized outer loop value D_SINR_Init of the user equipment according to the first outer loop value D_SINR0 and the second outer loop value D_SINR1                    S34

Fig. 5

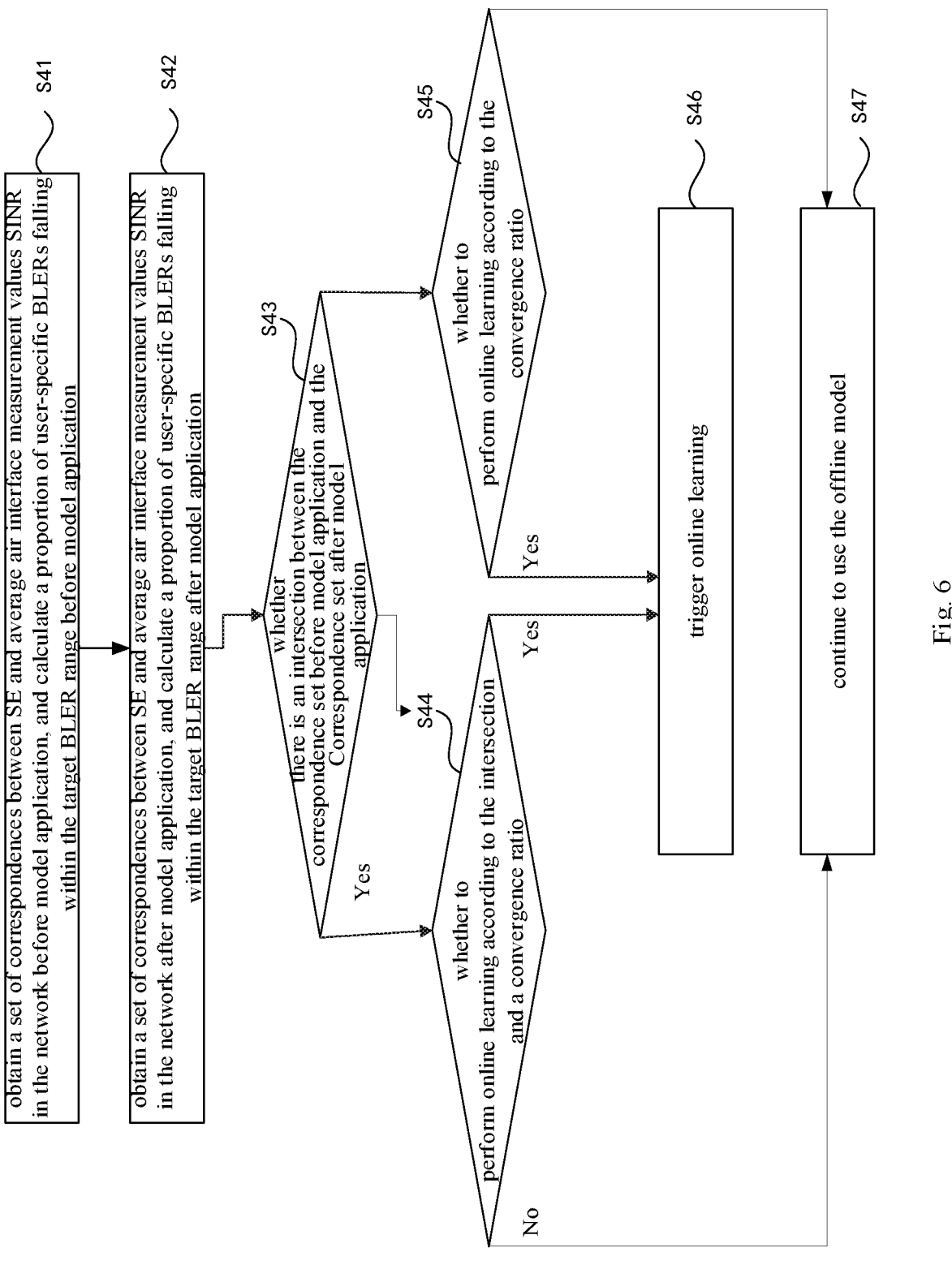

Fig. 6

S41 obtain a set of correspondences between SE and average air interface measurement values SINR in the network before model application, and calculate a proportion of user-specific BLERs falling within the target BLER range before model application S42 obtain a set of correspondences between SE and average air interface measurement values SINR in the network after model application, and calculate a proportion of user-specific BLERs falling within the target BLER range after model application S43 whether there is an intersection between the correspondence set before model application and the Correspondence set after model application S44 whether to perform online learning according to the intersection and a convergence ratio S45 whether to perform online learning according to the convergence ratio Yes Yes Yes No S46 trigger online learning S47 continue to use the offline model

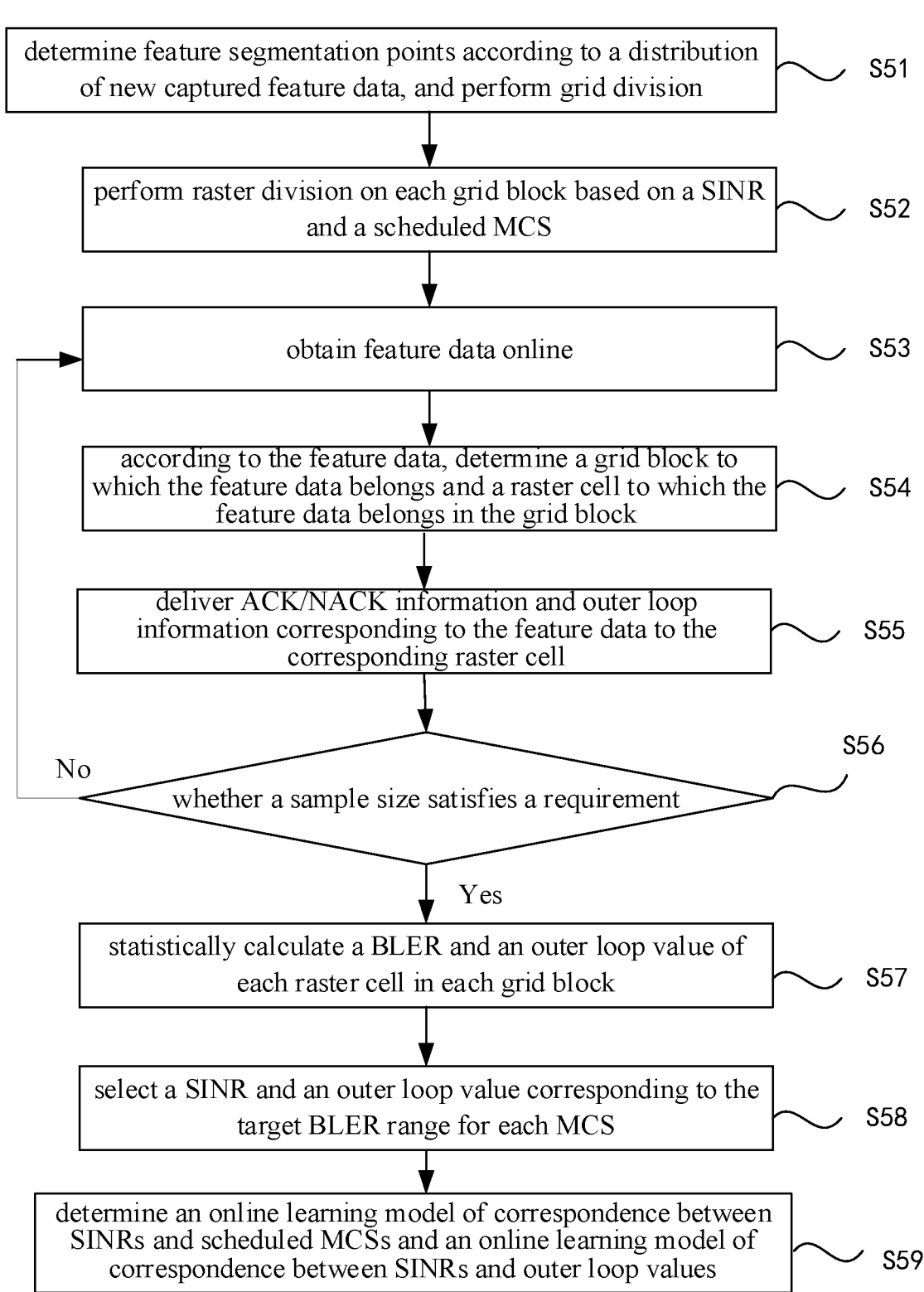

determine feature segmentation points according to a distribution of new captured feature data, and perform grid division — S51 perform raster division on each grid block based on a SINR and a scheduled MCS — S52 obtain feature data online — S53 according to the feature data, determine a grid block to which the feature data belongs and a raster cell to which the feature data belongs in the grid block — S54 deliver ACK/NACK information and outer loop information corresponding to the feature data to the corresponding raster cell — S55

S56

No whether a sample size satisfies a requirement

Yes statistically calculate a BLER and an outer loop value of each raster cell in each grid block — S57 select a SINR and an outer loop value corresponding to the target BLER range for each MCS — S58 determine an online learning model of correspondence between SINRs and scheduled MCSs and an online learning model of correspondence between SINRs and outer loop values — S59

Fig. 7

OUTER RING VALUE DETERMINATION METHOD AND APPARATUS, AND DEVICE AND STORAGE MEDIUM

CROSS-REFERENCE TO RELATED APPLICATION

This application is a national stage filing under 35 U.S.C. § 371 of international application number PCT/CN2021/100443, filed Jun. 16, 2021, which claims priority to Chinese patent application No. 202010591941.2 filed Jun. 24, 2020. The contents of these applications are incorporated herein by reference in their entirety.

TECHNICAL FIELD

The present disclosure relates to the technical field of wireless communication, and specifically to a method and apparatus for determining an outer loop value, a device, and a storage medium.

BACKGROUND

Due to the fast-changing characteristics of wireless channels, it is difficult to make full use of spectrum resources if a fixed modulation and coding scheme is adopted. Therefore, an Adaptive Modulation and Coding (AMC) technology is introduced in wireless communication technologies to improve spectral efficiency.

In order to realize the adaptation of modulation and coding schemes and user channel conditions, the conventional AMC requires an Acknowledge/Non-Acknowledge (ACK/NACK) to adjust the outer loop value to achieve a target reliability requirement set by the network. However, the above convergence process often consumes dozens or even hundreds of transmission opportunities of user equipments. As a result, in some cases, the information transmission may end before a user equipment converge, or in some cases, the user equipment may have converged but the previous dozens or even hundreds of transmissions are not performed based on an optimal modulation and coding scheme, which restricts the improvement of spectral efficiency.

The information transmission in the fifth-generation mobile communications makes full use of spatial resources due to the introduction of Massive MIMO technology, and has a larger transmission bandwidth. These factors lead to fewer scheduling times for data packets in 5G under the condition of the same data packet size, which further exacerbates the problems of resource waste and user perception degradation caused by users of small packets not converging.

SUMMARY

The present disclosure provides a method and apparatus for determining an outer loop value, a device, and a storage medium.

In accordance with an aspect of the present disclosure, an embodiment provides a method for determining an outer loop value. The method may include: determining a pre-trained outer loop initialization model based on current feature data of a user equipment; and determining an initialized outer loop value of the user equipment based on a current air interface measurement value of the user equipment and the outer loop initialization model.

In accordance with another aspect of the present disclosure, an embodiment provides an apparatus for determining an outer loop value. The apparatus may include: a model determining module, configured for determining a pre-trained outer loop initialization model based on current feature data of a user equipment; and an outer loop value determining module, configured for determining an initialized outer loop value of the user equipment based on a current air interface measurement value of the user equipment and the outer loop initialization model.

In accordance with another aspect of the present disclosure, an embodiment provides a device. The device includes: at least one processor; a memory, configured for storing at least one program which, when executed by the at least one processor, causes the at least one processor to implement any one of the methods provided in the embodiments of the present disclosure.

In accordance with another aspect of the present disclosure, an embodiment provides a storage medium, storing a computer program which, when executed by a processor, causes the processor to implement any one of the methods provided in the embodiments of the present disclosure.

The above embodiments and other aspects and implementations of the present disclosure will be further described in the brief description of drawings, detailed description, and appended claims.

BRIEF DESCRIPTION OF DRAWINGS

FIG. 2 is a flowchart of learning of an outer loop initialization model in an offline state according to an embodiment of the present disclosure;

FIG. 5 is a flowchart of a model application method according to an embodiment of the present disclosure;

FIG. 6 is a flowchart of a method for triggering offline learning to online learning according to an embodiment of the present disclosure;

FIG. 7 is a flowchart of a method for online learning of an outer loop initialization model according to an embodiment of the present disclosure;

DETAILED DESCRIPTION

Figure 1:
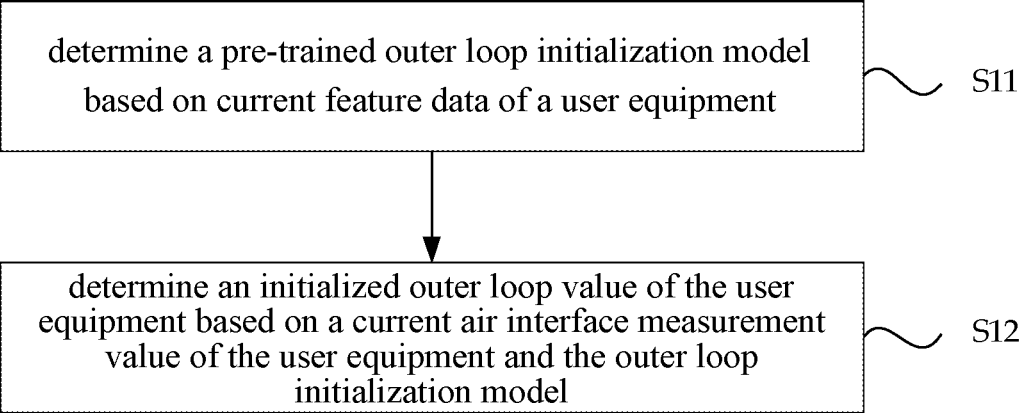
FIG. 1 is a flowchart of a method for determining an outer loop value according to an embodiment of the present disclosure.

Objects, technical schemes and advantages of the present disclosure will become clear from a detailed description of embodiments of the present disclosure in conjunction with the drawings. It is to be noted that if not in conflict, the embodiments and features in the present disclosure may be combined with each other.

The steps shown in the flowcharts of the drawings may be performed in a computer system including, for example, a set of computer-executable instructions. Also, although a logical order is shown in the flowcharts, in some cases the steps shown or described may be performed in an order different from which shown or described herein.

With the development of mobile communication technologies, people's demand for communication is gradually increasing, for example from voice-based communication to today's data-based communication. Especially the fourth-generation mobile communication has gradually changed people's lives. Today, people's communication needs are still increasing. Such needs include, for example, watching high-definition live broadcasts in real time through higher service rates; communicate face-to-face with relatives thousands of miles away in a virtual environment, as if being there, close at hand. Existing networks have brought people a good visual and auditory experience, but people still want to have a sense of touch, which is needed by the Internet of Things in vertical industries such as the transportation industry, public service industry, and manufacturing industry, by telemedicine, and the like. To meet these needs, the fifth-generation mobile communication technology has emerged.

In future 5G communications, the diversity of services and communication methods will inevitably increase the complexity of wireless scheme design. The complexity of current or future problems may increase exponentially, and these problems cannot be solved by the original plans and thinking. However, future communication will generate a large amount of data. Based on these empirical data, machine learning can be used to train related models, so as to use empirical models to make predictions, develop policies, etc.

A wireless channel has a narrower coherence bandwidth and shorter coherence time than a wired channel, which is a remarkable feature of the wireless channel. Due to the fast-changing characteristics of wireless channels, it is difficult to make full use of spectrum resources if a fixed modulation and coding scheme is adopted. Therefore, an AMC technology is introduced in wireless communication technologies to improve spectral efficiency. The basic idea of AMC is to adopt an appropriate channel modulation and coding scheme to adapt to channel conditions, thereby improving spectral efficiency and user perception.

In order to realize the adaptation of modulation and coding schemes and user channel conditions, the conventional AMC requires ACK/NACK information fed back by the user equipment to adjust the outer loop to achieve a target reliability requirement set by the system. However, the above convergence process often requires dozens or even hundreds of transmission opportunities of user equipments. As a result, the transmission may end before some user equipments converge, or the user equipments may have converged but the previous dozens or even hundreds of transmissions are not performed based on an optimal modulation and coding scheme, which restricts the improvement of spectral efficiency. In addition, because the optimal modulation and coding scheme is not adopted, the user's perception of the service will also be affected.

In 4G and 5G networks, there are a large number of small-packet users, that is, users with small traffic. The characteristics of small-packet user services are the key factors which restrict the adaptive modulation and coding scheme from improving the spectral efficiency. For small packets, there is a lack of learning opportunities for the adaptive coding process to converge. In addition, because 5G uses a larger bandwidth and more antennas to make full use of the spatial dimension, 5G will have fewer transmission opportunities for users in the case of the same traffic volume.

To address the above problems, the following technical schemes are provided in the present disclosure.

In an embodiment, the present disclosure provides a method for determining an outer loop value. FIG. 1 is a flowchart of a method for determining an outer loop value according to an embodiment of the present disclosure. This embodiment can be applied to an AMC technology. The method can be executed by an apparatus for determining an outer loop value provided in the embodiments of the present disclosure. The apparatus can be implemented by software and/or hardware.

As shown in FIG. 1, the method for determining an outer loop value provided in the embodiment of the present disclosure mainly includes operations S11 and S12.

At S11, a pre-trained outer loop initialization model is determined based on current feature data of a user equipment.

At S12, an initialized outer loop value of the user equipment is determined based on a current air interface measurement value of the user equipment and the outer loop initialization model.

It should be noted that the pre-trained outer loop initialization model is an outer loop initialization model trained in an offline state, and the term "offline model" in the present disclosure may refer to the pre-trained outer loop initialization model.

In an implementation, the outer loop initialization model includes a first outer loop model and a second outer loop model. Determining a pre-trained outer loop initialization model based on current feature data of a user equipment includes: determining a grid block to which the user equipment belongs based on the current feature data of the user equipment and a grid division policy; and obtaining the first outer loop model and the second outer loop model corresponding to the grid block to which the user equipment belongs.

In an implementation, determining an initialized outer loop value of the user equipment based on a current air interface measurement value of the user equipment and the outer loop initialization model includes: determining a first outer loop value based on the current air interface measurement value and the first outer loop model; determining a second outer loop value based on the current air interface measurement value and the second outer loop model; and determining the initialized outer loop value based on the first outer loop value and the second outer loop value.

In an implementation, determining a first outer loop value based on the current air interface measurement value and the first outer loop model includes: determining a Modulation and Coding Scheme (MCS) corresponding to the current air interface measurement value based on the current air interface measurement value and the first outer loop model, where the first outer loop model is a model of correspondence between air interface measurement values and MCSs under a set target Block Error Rate (BLER) range; obtaining a system mapping Signal to Interference plus Noise Ratio (SINR) corresponding to a target BLER based on the determined MCS and a reference demodulation curve; and determining a difference between the system mapping SINR and the current air interface measurement value as the first outer loop value.

In an implementation, determining a second outer loop value based on the current air interface measurement value and the second outer loop model includes: obtaining the second outer loop value through the second outer loop model based on the current air interface measurement value, where the second outer loop model is a model of correspondence between air interface measurement values and outer loop values under a set target BLER range.

In an implementation, prior to determining a pre-trained outer loop initialization model based on current feature data of a user equipment, the method further includes: training the outer loop initialization model based on historical feature data of the user equipment.

In an implementation, training the outer loop initialization model based on historical feature data of the user equipment includes: performing grid division and raster division based on the historical feature data; determining an Acknowledge/Non-Acknowledge (ACK/NACK) information count and an outer loop value in each raster cell; calculating a BLER of each raster cell based on the ACK/NACK information count in each raster cell; and determining the outer loop initialization model based on the BLER and the outer loop value of each raster cell.

In an implementation, performing grid division and raster division based on the historical feature data includes: performing grid division on each cell in a network based on the historical feature data; and performing raster division on each grid block based on a scheduled MCS and a corresponding air interface measurement value.

In an implementation, determining an ACK/NACK information count and an outer loop value in each raster cell includes: obtaining ACK/NACK information corresponding to demodulation; delivering the ACK/NACK information and corresponding outer loop information to the corresponding raster cell; and calculating the ACK/NACK information count and the outer loop value in each raster cell.

In an implementation, determining the outer loop initialization model based on the BLER and the outer loop value of each raster cell includes: determining MCSs corresponding to air interface measurement values under a set target BLER range and outer loop values corresponding to the air interface measurement values based on the BLER of each raster cell in each grid block; determining a first outer loop model based on a correspondence between the air interface measurement values and the MCSs; and determining a second outer loop model based on a correspondence between the air interface measurement values and the outer loop values.

In an implementation, determining MCSs corresponding to air interface measurement values under a set target BLER range and outer loop values corresponding to the air interface measurement values based on the BLER of each raster cell includes: for an MCS, if a number of raster cells which satisfy the set target BLER range is greater than a preset value, calculating a weight factor of each raster cell according to the ACK/NACK information count in each raster cell; performing weighted averaging on the air interface measurement values corresponding to the raster cells based on the weight factor of each raster cell, to obtain an air interface measurement value corresponding to the MCS; performing weighted averaging on the outer loop values corresponding to the raster cells based on the weight factor of each raster cell, to obtain an outer loop value corresponding to the MCS; and determining the outer loop value corresponding to the air interface measurement value according to the air interface measurement value corresponding to the MCS and the outer loop value corresponding to the MCS.

In an implementation, determining MCSs corresponding to air interface measurement values under a set target BLER range and outer loop values corresponding to the air interface measurement values based on the BLER of each raster cell includes: for an MCS, if a number of raster cells which satisfy the set target BLER range is less than a preset value, searching for an air interface measurement value range which corresponds to the target BLER range corresponding to the MCS on a reference demodulation curve; determining a difference between a median value in the found air interface measurement value range and a system default initialized outer loop value as an air interface measurement value corresponding to the MCS; and determining the system default initialized outer loop value as the outer loop value corresponding to the air interface measurement value.

In an implementation, after the initialized outer loop value of the user equipment is determined based on the current air interface measurement value of the user equipment and the outer loop initialization model, the method further includes: obtaining a first network performance indicator before model application and a second network performance indicator after the outer loop initialization model is applied; starting online learning to obtain an online outer loop model if the first network performance indicator and the second network performance indicator satisfy a preset condition; and determining a new initialized outer loop value of the user equipment by utilizing the online outer loop model.

It should be noted that the online outer loop model is an outer loop initialization model trained in an online state, and the term "online model" in the present disclosure may refer to the online outer loop model.

In an implementation, the method further includes: correcting an outer loop model of a corresponding grid block based on ACK/NACK information of the user equipment in the grid block after the user equipment uses the outer loop model for a first time, where the outer loop model includes a pre-trained outer loop initialization model or an online outer loop model.

In an implementation, correcting an outer loop model of a corresponding grid block based on ACK/NACK information of the user equipment in the grid block after the user equipment uses the outer loop model for a first time includes: calculating a proportion of NACKs in the ACK/NACK information for each grid block; decreasing an outer loop value of the outer loop model according to a corresponding policy if the proportion of NACKs is greater than a target value; and increasing the outer loop value of the outer loop model according to a corresponding policy if the proportion of NACKs is less than the target value.

In an embodiment, a method for learning of an outer loop initialization model in an offline state is provided. As shown in FIG. 2, the method for learning of an outer loop initialization model in an offline state mainly includes the following operations S21 to S28.

At S21, grid division is performed based on historical feature data.

According to the collected historical feature data of the user equipment in the network, grid division is performed.

For example, the historical feature data includes: user transmission mode, scheduled air interface measurement value SINR, space division flag; RANK; a supported maximum modulation order (64QAM, 256QAM); corresponding demodulation ACK/NACK; outer loop information, and the like. The user transmission mode includes: single port, closed-loop multiplexing RI=1, and closed-loop multiplexing RI=2.

Figure 3:
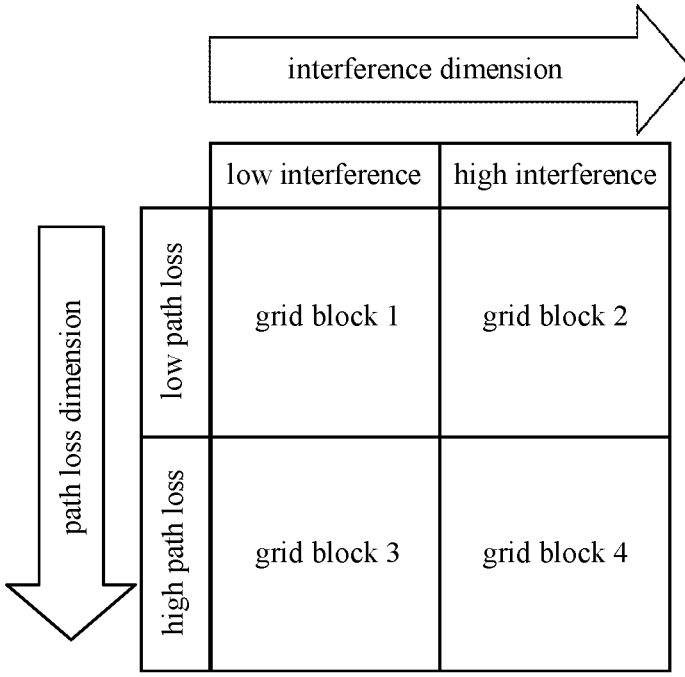
FIG. 3 is a schematic diagram showing grid division according to an embodiment of the present disclosure.

As shown in FIG. 3, According to the interference level (high interference or low interference) and path loss level thresholds which can be set in advanced, a cell is divided into four grid blocks, namely, grid block 1 with low interference and low path loss, grid block 2 with high interference and low path loss, grid block 3 with low interference and high path loss, and grid block 4 with high interference and high path loss.

At S22, raster division is performed on each grid block based on a scheduled MCS and a corresponding air interface measurement value SINR.

Figure 4:
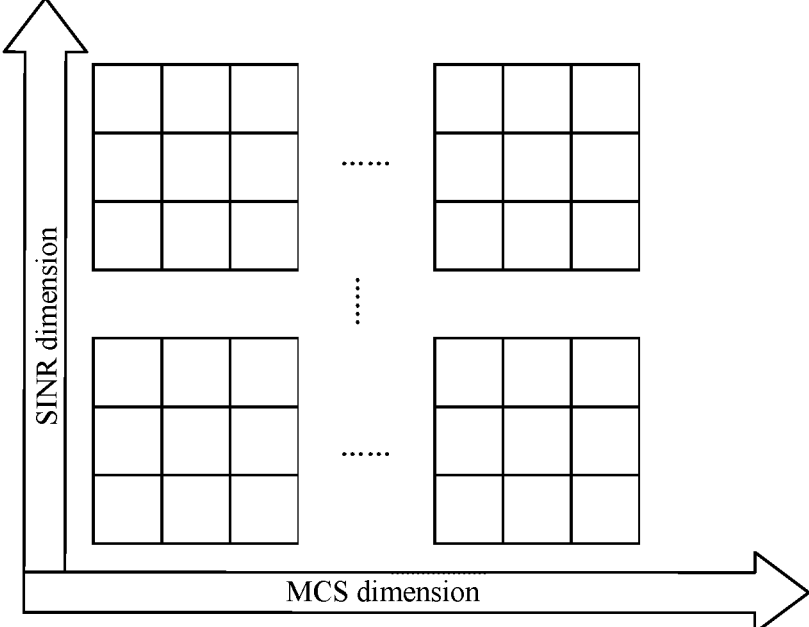
FIG. 4 is a schematic diagram showing raster division according to an embodiment of the present disclosure.

As shown in FIG. 4, a two-dimensional division is performed by taking the MCS with a granularity of one order as a horizontal axis and the air interface measurement SINR value with a granularity of 0.5 dB as the vertical axis.

At S23, new feature data is cyclically captured offline.

At S24, according to the captured new feature data, a grid block to which the new feature data belongs and a raster cell to which the new feature data belongs in the grid block are determined.

At S25, ACK/NACK information corresponding to actual demodulation and outer loop information are delivered to the raster cell in the grid block.

At S26, it is determined whether processing of the captured new feature data has been completed. If yes, S27 is executed; if not, S23 is executed.

At S27, a BLER and an outer loop value of each raster cell in each grid block are statistically calculated.

In an embodiment, according to the calculated ACK/NACK count of each raster cell in each grid block, the BLER corresponding to the raster cell and the outer loop value corresponding to the raster cell are calculated. If a sample size of the raster cell is less than a certain threshold, the raster cell is labeled as NULL.

At S28, a model of correspondence between air interface measurement values SINR and scheduled MCSs under the set target BLER range and a model of correspondence between air interface measurement values SINR and outer loop values under the set target BLER range are determined, according to the calculated BLER of each raster cell in each grid block and the corresponding outer loop value.

In an embodiment, in the grid block, for each MCS, a raster cell whose corresponding BLER satisfies the set BLER range is searched for, so as to determine the air interface measurement value SINR corresponding to the MCS and the outer loop value corresponding to the air interface measurement SINR, which includes the following operations S281 to S285.

At S281, for one MCS, if a number of raster cells which satisfy the set BLER range is greater than 1, a weight factor of each raster cell is calculated.

A calculation method is: calculating a ratio of the number of samples (total ACK/NACK count) contained in the raster cell satisfying the condition to the sum of the numbers of samples of all the raster cells satisfying the condition.

At S282, weighted averaging is performed, according to the weight factors, on the air interface measurement value SINR corresponding to each raster cell; and weighted averaging is performed, according to the weight factors, on the outer loop value corresponding to each raster cell.

At S283, a scheduled MCS which satisfies the target BLER range under the air interface measurement value SINR, and the outer loop value corresponding to the air interface measurement value SINR are determined.

At S284, if no raster cell satisfying the set BLER range is found for an MCS, a SINR range corresponding to a target BLER range on a system reference demodulation curve (which is generally a simulated curve) is searched for the MCS, then a system default initialized outer loop value is subtracted from a median value in the SINR range to obtain an air interface measurement value SINR corresponding to the MCS, and the system default initialized outer loop value is determined as an outer loop value corresponding to the air interface measurement value SINR.

At S285, through the above process, a scheduled MCS which corresponds to each air interface measurement value and which satisfies the target BLER range and the outer loop value corresponding to each air interface measurement value SINR can be determined, i.e., the learning models are: a model of correspondence between air interface measurement values SINR and scheduled MCSs under the set target BLER range, expressed as $$Model\_Ofline\_Grad_j^0;$$

and a model of correspondence between air interface measurement values SINR and outer loop values ΔSINR under the set target BLER range, expressed as $$Model\_Ofline\_Grad_j^1.$$

In an embodiment, a model application method is provided. As shown in FIG. 5, the model application method mainly includes the following operations S31 to S34.

At S31, a grid block to which current feature data corresponding to a user equipment belongs is determined, and a model corresponding to the grid block is scheduled.

In an embodiment, according to the current feature data corresponding to the user equipment and a grid division policy, a grid block to which the user equipment belongs is determined, and models $$Model\_Ofline\_Grad_j^0 \text{ and } Model\_Ofline\_Grad_j^1$$

corresponding to the grid block are obtained.

At S32, according to an air interface measurement value SINR0 corresponding to the user equipment, a corresponding MCS is determined by the model $$Model\_Ofline\_Grad_j^0,$$

a median value SINR1 in a SINR range corresponding to the target BLER range is obtained based on the MCS and a system reference BLER curve, and a first outer loop value is calculated based on SINR0 and SINR1: D_SINR0=SINR1−SINR0.

At S33, based on the air interface measurement value SINR0 corresponding to the user equipment, a corresponding second outer loop value D_SINR1 is obtained by the model $$Model\_Ofline\_Grad_j^1.$$

At S34, an initialized outer loop value D_SINR_Init of the user equipment is calculated according to the first outer loop value D_SINR0 and the second outer loop value D_SINR1.

In an embodiment, a method for triggering offline learning to online learning is provided. As shown in FIG. 6, the method for triggering offline learning to online learning mainly includes the following operations S41 to S47.

At S41, a set of correspondences between Spatial Efficiency (SE) and average air interface measurement values SINR in the network before model application is obtained, and a proportion of user-specific BLERs falling within the target BLER range before model application is calculated.

At S42, a set of correspondences between SE and average air interface measurement values SINR in the network after model application is obtained, and a proportion of user-specific BLERs falling within the target BLER range after model application is calculated.

At S43, it is determined whether there is an intersection between the correspondence set before model application and the correspondence set after model application. If yes, S44 is executed; and if not, S45 is executed.

At S44, it is determined whether to perform online learning according to the intersection and a convergence ratio. If yes, S46 is executed; and if not, S47 is executed.

At S45, it is determined whether to perform online learning according to the convergence ratio. If yes, S46 is executed; and if not, S47 is executed.

At S46, online learning is triggered.

At S47, the offline model continues to be used.

In an embodiment, a method for online learning of an outer loop initialization model is provided. As shown in FIG. 7, the method for online learning of an outer loop initialization model mainly includes the following operations S51 to S59.

At S51, feature segmentation points are determined according to a distribution of new captured feature data, and grid division is performed.

At S52, raster division is performed on each grid block based on a SINR and a scheduled MCS.

At S53, feature data is obtained online.

At S54, according to the feature of the feature data, a grid block to which the feature data belongs and a raster cell to which the feature data belongs in the grid block are determined.

At S55, ACK/NACK information and outer loop information corresponding to the feature data is delivered to the corresponding raster cell.

At S56, it is determined whether a sample size satisfies a certain requirement. If yes, S57 is executed; and if not, S53 is executed.

At S57, a BLER and an outer loop value of each raster cell in each grid block are statistically calculated.

At S58, a SINR and an outer loop value corresponding to the target BLER range are selected for each MCS.

At S59, an online learning model of correspondence between SINRs and scheduled MCSs and an online learning model of correspondence between SINRs and outer loop values are determined.

Figure 8:
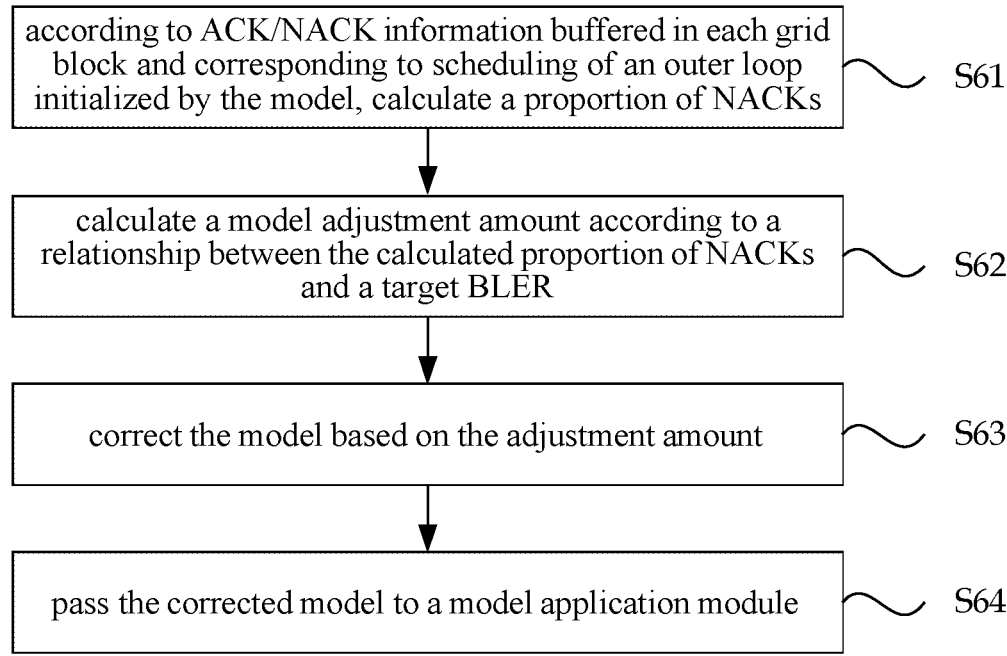
FIG. 8 is a flowchart of a method for correcting the outer loop initialization model according to an embodiment of the present disclosure.

In an embodiment, a method for correcting an outer loop initialization model is provided. As shown in FIG. 8, the method for correcting an outer loop initialization model mainly includes the following operations S61 to S64.

At S61, according to ACK/NACK information buffered in each grid block and corresponding to scheduling of an outer loop initialized by the model, a proportion of NACKs is calculated.

At S62, a model adjustment amount is calculated according to a relationship between the calculated proportion of NACKs and a target BLER.

At S63, the model is corrected based on the adjustment amount.

At S64, the corrected model is passed to a model application module.

Figure 9:
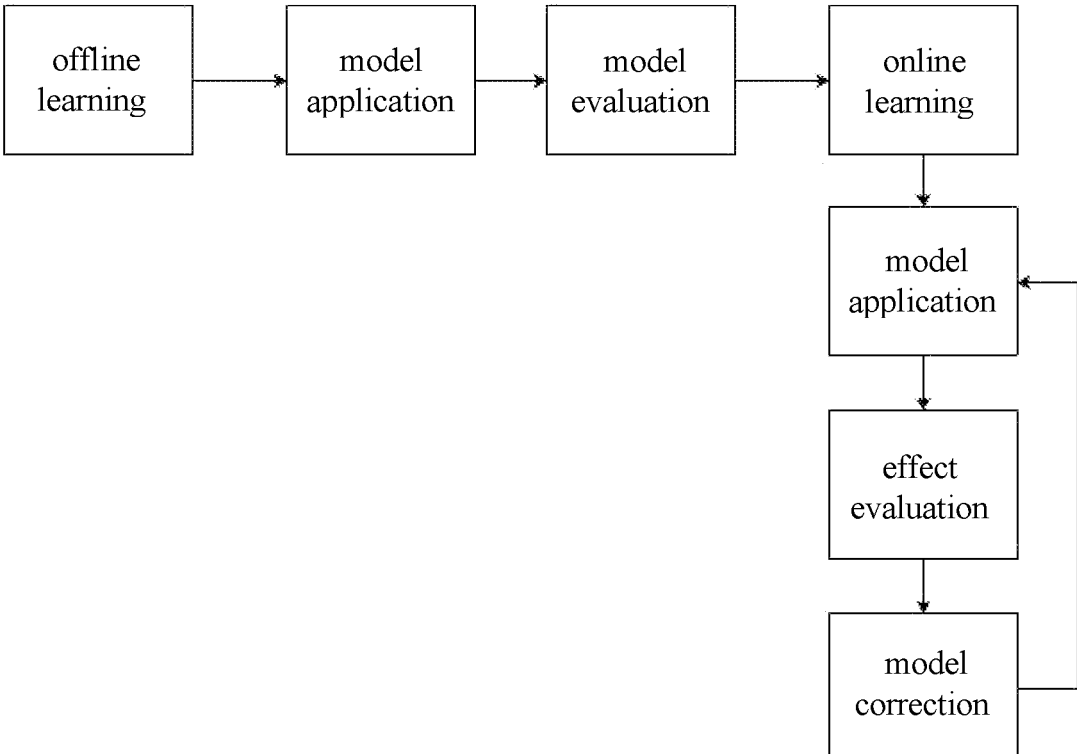
FIG. 9 is an overall flowchart of a method for determining an outer loop value according to an embodiment of the present disclosure.

In an embodiment, an overall process of determining an outer loop value is provided. As shown in FIG. 9, the overall process mainly includes seven operations: offline learning, model application, model evaluation, online learning, model application, effect evaluation and model modification.

In an embodiment, a method for determining an outer loop value is provided. The method for determining an outer loop value mainly includes the following operations S81 to S812.

At S81, grid division is performed based on historical feature data.

According to the collected historical feature data of the user equipment in the network, grid division is performed.

For example, the historical feature data includes: user transmission mode, scheduled air interface measurement value SINR, space division flag; RANK; a supported maximum modulation order (64QAM, 256QAM); corresponding demodulation ACK/NACK; outer loop information, and the like. The user transmission mode includes: single port, closed-loop multiplexing RI=1, and closed-loop multiplexing RI=2.

In a non-space division case, a cell is divided into 24 grid blocks based on three transmission modes (single port, closed-loop multiplexing RI=1, and closed-loop multiplexing RI=2), two interference levels (high interference and low interference), the supported maximum modulation order (64QAM, 256QAM), and a resource block (RB) quantity (large and small RBs). In a space division case, a cell is divided into 40 grid blocks based on the RANK (having five possibilities: 2, 3, 4, 5, or greater than or equal to 6), two interference levels (high interference and low interference), the supported maximum modulation order (64QAM, 256QAM), and the RB quantity (large and small RBs). In some examples, the division at the grid block level may further include chip type information of the user equipment, demodulation algorithm information, beam position information of the user equipment, and the like. It should be noted that, the above grid division method is merely an example, and is not intended to limit the present disclosure.

At S82, raster division is performed on each grid block based on a scheduled MCS and a corresponding air interface measurement value SINR.

For example, a two-dimensional division is performed by taking the MCS with a granularity of one order as a horizontal axis and the SINR value with a granularity of 0.5 dB as the vertical axis.

At S83, according to new captured feature data, a grid block to which the new feature data belongs and a raster cell to which the new feature data belongs in the grid block are determined; and ACK/NACK information corresponding to actual demodulation and outer loop information are delivered to the raster cell in the grid block.

In an embodiment, it is determined according to the captured new feature data whether space division is used. In a non-space division case, the grid block to which the user data belongs is found according to the transmission mode, the interference level, configuration information of the supported maximum modulation order, and the number of scheduled RBs. ACK/NACK information corresponding to actual demodulation and outer loop information are delivered to the raster cell in the grid block according to the scheduled MCS and the air interface measurement value SINR. The ACK/NACK information count and the outer loop value are recorded in each raster cell (where an ACK count and a NACK count are recorded separately).

In a space division case, the grid block to which the user data belongs is found according to the RANK, the interference level, the configuration information of the supported maximum modulation order, and the number of scheduled RBs. ACK/NACK information corresponding to actual demodulation and outer loop information are delivered to the raster cell in the grid block according to the scheduled MCS and the air interface measurement value SINR. The ACK/NACK count and the outer loop value are recorded in each raster cell (where an ACK count and a NACK count are recorded separately).

At S84, a BLER and an outer loop value of each raster cell in each grid block are statistically calculated.

In an embodiment, according to the calculated ACK/NACK count of each raster cell in each grid block, the BLER corresponding to a raster cell and the outer loop value corresponding to the raster cell are calculated. If a sample size of the raster cell is less than a certain threshold, the raster cell is labeled as NULL.

At S85, a model of correspondence between air interface measurement values SINR and scheduled MCSs under the set target BLER range and a model of correspondence between air interface measurement values SINR and outer loop values under the set target BLER range are determined according to the calculated BLER of each raster cell in each grid block and the corresponding outer loop value.

In an embodiment, in the grid block, for each MCS, a raster cell whose corresponding BLER satisfies the set BLER range is searched for, so as to determine the air interface measurement value SINR corresponding to the MCS and the outer loop value corresponding to the air interface measurement SINR, which includes the following operations S851 to S855.

At S851, if a number of raster cells which satisfy the set BLER range for one MCS is greater than 1, a weight factor of each raster cell is calculated.

A calculation method is: calculating a ratio of the number of samples (total ACK/NACK count) contained in the raster cell satisfying the condition to the sum of the numbers of samples of all the raster cells satisfying the condition.

At S852, weighted averaging is performed on the air interface measurement value SINR corresponding to each raster cell and performed on the outer loop value corresponding to each raster cell according to the weight factors.

At S853, for the MCS, an air interface measurement value SINR satisfying the target BLER range and a corresponding outer loop value are determined.

At S854, if no raster cell satisfying the set BLER range is found for an MCS, a demodulated value SINR range corresponding to a target BLER range on a system reference demodulation curve (which is generally a simulated curve) is searched for the MCS, then a system default initialized outer loop value is subtracted from a median value in the SINR range to obtain an air interface measurement value SINR corresponding to the MCS, and the system default initialized outer loop value is determined as an outer loop value corresponding to the air interface measurement value SINR.

At S855, through the above process, a scheduled MCS which corresponds to each air interface measurement value and which satisfies the target BLER range and the outer loop value corresponding to each air interface measurement value SINR can be determined, i.e., the learning models are:

a model of correspondence between air interface measurement values SINR and scheduled MCSs under the set target BLER range, expressed as $$\text{Model\_Ofline\_Grad}_j^0 =$$

$$\left\{ \left( SINR_i, MCS_i^0 \right) \mid BLER\!\left( SINR_i, MCS_i^0 \right) \in [0.08, 0.12], i = 1, 2, \cdots, N \right\};$$

a model of correspondence between air interface measurement values SINR and outer loop values $\Delta$SINR under the set target BLER range, expressed as $$\text{Model\_Ofline\_Grad}_j^1 =$$

$$\left\{ \left( SINR_i, \Delta SINR_i^1 \right) \mid BLER\!\left( SINR_i, \Delta SINR_i^1 \right) \in [0.08, 0.12], i = 1, 2, \cdots, N \right\},$$

where, [0.08, 0.12] represents the target BLER range;

$$\left( SINR_i, MCS_i^0 \right)$$

represents a combination of an air interface measurement value satisfying the target BLER range and a scheduled MCS;

$$\left( SINR_i, \Delta SINR_i^1 \right)$$

represents a combination of an air interface measurement value satisfying the target BLER range and an outer loop value; BLER(•) represents a BLER under the corresponding combination;

$$\text{Model\_Ofline\_Grad}_j^0$$

represents an offline learning model of correspondence between air interface channel quality of a j-th grid block and a scheduled MCS;

$$\text{Model\_Ofline\_Grad}_j^1$$

represents an offline learning model of correspondence between the air interface channel quality of the j-th grid block and an outer loop value, j=1, . . . 64; N represents the number of MCSs which the system can support.

At S86, before the application of the outer loop initialization model, a set of correspondences between SE and air interface measurement values SINR in the network is obtained as:

$$\text{Set\_p}_0 = \left\{ \left( SINR\_B_i, SE_i^0 \right) \mid i = 1, 2 \cdots, K_0 \right\},$$

and a proportion R0 of user-specific BLERs falling within the target BLER range before the application of the outer loop initialization model is calculated, where $K_0$ represents the number of sample points, and Set\_p$_0$ represents a network performance set before the model application.

At S87, the outer loop initialization model is applied.

At S871, according to the feature data corresponding to the user equipment and a grid division policy, the grid block to which the user equipment belongs is determined, and models $$\text{Model\_Ofline\_Grad}_j^0 \text{ and Model\_Ofline\_Grad}_j^1$$

corresponding to the grid block are obtained.

At S872, according to a current air interface measurement value SINR0 corresponding to the user equipment, a corresponding MCS is determined by the model $$\text{Model\_Ofline\_Grad}_j^0,$$

a median value SINR1 in a SINR range corresponding to the target BLER range is obtained based on the MCS and a system reference BLER curve, and an outer loop value is calculated based on SINR0 and SINR1: D_SINR0=SINR1-SINR0.

At S873, based on the current air interface measurement value SINR0 corresponding to the user equipment, a corresponding outer loop value D_SINR1 is obtained by the model $$\text{Model\_Ofline\_Grad}_j^1.$$

At S874, an outer loop value to be initialized for the user equipment is calculated as:

$$\text{D\_SINR\_Init} = \min\{\max\{(\text{D\_SINR0} + \text{D\_SINR1})/2, -\text{V\_limt}\}, \text{V\_limt}\}$$

where V_limt represents a protection limit value, which is greater than 0, and is 10 by default.

At S88, after the model application, a set of correspondences between SE and average air interface measurement values SINR in the network is obtained as:

$$\text{Set\_p}_1 = \{(SINR_i^1, SE_i^1) \mid i = 1, 2\ldots, K_1\},$$

1, 2, . . . , $K_1$}, and a proportion R1 of user-specific BLERs falling within the target BLER range is calculated, where $K_1$ represents the number of sample points, and Set_$p_1$ represents a network performance set after the model application.

At S89, it is determined whether there is an intersection between the air interface channel quality SINRs in the Set_$p_0$ and Set_$p_1$.

At S891, if there is an intersection, a performance difference corresponding to the intersection is calculated, and expressed as {D_SE$_i$|i=1, 2, . . . M},
where D_SE$_i$ represents a difference between SE corresponding to an i-th element in the intersection after the model application and SE corresponding to the i-th element in the intersection before the model application.

At S8911, a proportion R2 of elements less than 0 in {D_SE$_i$|i=1, 2, . . . M}, and an average value D_SE_mean of the elements in the set are calculated.

At S8912, if D_SE_mean≥Th$_0$, R$_2$≥Th$_1$ and R$_0$≥R$_1$, or if D_SE_mean<Th$_0$, S810 is executed. Otherwise, the current model continues to be used for outer loop initialization for new user equipments which are connected to the network.

At S892, if there is no intersection and R$_0$≥R$_1$, S810 is executed. Otherwise, the current model continues to be used for outer loop initialization for new user equipments which are connected to the network.

At S810, the use of the current model is stopped, and online learning is started.

At S8101, user-specific data related to scheduling information is collected online, including: user transmission modes including: single port, closed-loop multiplexing RI=1, and closed-loop multiplexing RI=2; interference level; scheduled MCS; quantity of allocated RBs; air interface measurement value SINR; space division flag; RANK; a supported maximum modulation order (64QAM, 256QAM); corresponding demodulation ACK/NACK; and outer loop information. A model update flag is initialized as: Model_change_index=0. A model performance evaluation set AI_ΔSINR_int_set is initialized to be NULL.

At S8102, grid division is performed using appropriate segmentation points selected according to the distribution of feature data used for grid division in the current cell, for example, selecting 50% of quantiles of the distribution as a threshold.

At S8103, under the grid block-level set target BLER range [0.08, 0.12], a model of correspondence between air interface measurement values SINR and scheduled MCSs, expressed as:

$$\text{Model\_Online\_Grad}_j^0 =$$
$$\{(SINR_i, MCS_i^0) \mid BLER(SINR_i, MCS_i^0) \in [0.08, 0.12], i = 1, 2, \cdots, N\},$$

and a model of correspondence between air interface measurement values SINR and outer loop values ΔSINR, expressed as:

$$\text{Model\_Online\_Grad}_j^1 =$$
$$\{(SINR_i, \Delta SINR_i^1) \mid BLER(SINR_i, \Delta SINR_i^1) \in [0.08, 0.12], i = 1, 2, \ldots, N\},$$

1,2, . . . ,N}, are learning through S82 to S86, where [0.08, 0.12] represents the target BLER range;

$$(SINR_i, MCS_i^0)$$

represents a combination of an air interface measurement value SINR satisfying the target BLER range and a scheduled MCS;

$$(SINR_i, \Delta SINR_i^1)$$

represents a combination of an air interface measurement value SINR satisfying the target BLER range and an outer loop value; BLER(•) represents a BLER under the corresponding combination;

$$Model\_Online\_Grad_j^0$$

represents a model of correspondence between the air interface measurement value SINR of a j-th grid block and a scheduled MCS;

$$Model\_Online\_Grad_j^1$$

represents a model of correspondence between the air interface measurement value SINR of the j-th grid block and an outer loop value; j=1, . . . 64; N represents the number of MCSs which the system can support.

At S811, the online model is applied.

At S8111, according to the feature data corresponding to the user equipment and a grid division policy, the grid block to which the user equipment belongs is determined, and models $$Model\_Online\_Grad_j^0 \text{ and } Model\_Online\_Grad_j^1$$

corresponding to the grid block are obtained.

At S8112, according to an air interface measurement value SINR0 corresponding to the user equipment, a corresponding MCS is determined by the model $$Model\_Ofline\_Grad_j^0,$$

a median value SINR1 in a SINR range corresponding to the target BLER range is obtained based on the MCS and a system reference BLER curve, and an outer loop value is calculated based on SINR0 and SINR1: D_SINR0=SINR1−SINR0.

At S8113, based on the air interface measurement value SINR corresponding to the user equipment, a corresponding outer loop value D_SINR1 is obtained by the model $$Model\_Online\_Grad_j^1.$$

At S8114, an outer loop value to be initialized for the user equipment is calculated as:

$$D\_SINR\_Init = \min\{\max\{(D\_SINR0 + D\_SINR1)/2, -V\_limt\}, V\_limt\}$$

where V_limt represents a protection limit value, which is greater than 0, and is 10 by default.

At S8115, it is determined whether the model update flag Model_change_index is TRUE. If yes, AI_ΔSINR_int_set is initialized to be NULL, Model_change_index=0, corresponding demodulation information ACK/NACK when the user equipment is subjected to outer loop scheduling by this D_SINR_Init is recorded in AI_ΔSINR_int_set (not recorded for conservative scheduling). Otherwise, corresponding demodulation information ACK/NACK when the user equipment is subjected to outer loop by this D_SINR_Init is recorded in ΔI_ΔSINR_int_set (not recorded for conservative scheduling).

At S812, it is determined whether |AI_ΔSINR_int_set|≥Th_A/N_NUM is TRUE.

If yes, according to elements in AI_ΔSINR_int_set, a proportion of NACKs is calculated as: NACK_R; and a model adjustment amount is calculated according to the following relational expression:

$$\delta = \left(1 - \frac{NACK\_R}{BLER\_tart}\right)\lambda,$$

where BLER_tart represents a set target BLER, and λ represents a model adjustment step size.

The value of a channel quality dimension in the model $$Model\_Online\_Grad_j^0$$

is updated using a following equation:

$$SINR_i = \max\{\min(SINR_i - \delta, SINR_i + \beta), SINR_i - \beta\},$$

to obtain a new model $$Model\_Online\_Grad_j^0.$$

The value of the channel quality dimension in the model $$Model\_Online\_Grad_j^1$$

is updated using a following equation:

$$\Delta SINR_i^1 = \max\{\min(\Delta SINR_i^1 + \delta, \Delta SINR_i^1 + \gamma), SINR_i - \gamma\},$$

to obtain a new model $$Model\_Online\_Grad_j^1.$$

Model_change_index=1 is set, and S811 is executed.

Otherwise, it is determined to skip updating the model, and S811 is executed.

In an embodiment, a method for determining an outer loop value using an offline outer loop initialization model is provided. The method for determining an outer loop value using an offline outer loop initialization model mainly includes the following operations S91 to S910.

At S91, grid division is performed based on collected feature data of a user equipment in a network.

For example, the feature data of the user equipment includes: user transmission mode including single port, closed-loop multiplexing RI=1, and closed-loop multiplexing RI=2; interference level; scheduled MCS; quantity of allocated RBs; air interface measurement value SINR; space division flag; RANK; a supported maximum modulation order (64QAM, 256QAM); corresponding demodulation ACK/NACK; and outer loop information.

Without loss of generality, in a non-space division case, a cell is divided into 24 grid blocks based on three transmission modes (single port, closed-loop multiplexing RI=1, and closed-loop multiplexing RI=2), two interference levels (high interference and low interference), the supported maximum modulation order (64QAM, 256QAM), and an RB quantity (large and small RBs). In a space division case, a cell is divided into 40 grid blocks based on the RANK (having five possibilities: 2, 3, 4, 5, or greater than or equal to 6), two interference levels (high interference and low interference), the supported maximum modulation order (64QAM, 256QAM), and the RB quantity (large and small RBs). The division at the grid block level may further include chip type information of the user equipment, demodulation algorithm information, beam position information of the user equipment, and the like.

At S92, raster division is performed on each grid block based on a scheduled MCS and a corresponding air interface measurement value SINR.

For example, a two-dimensional division is performed by taking the MCS with a granularity of one order as a horizontal axis and the SINR value with a granularity of 0.5 dB as the vertical axis.

At S93, it is determined according to the new feature data of the user equipment whether space division is performed. In a non-space division case, the grid block to which the user data belongs is found according to the transmission mode, the interference level, configuration information of the supported maximum modulation order, and the number of scheduled RBs. ACK/NACK information corresponding to actual demodulation and outer loop information are delivered to the raster cell in the grid block according to the scheduled MCS and the air interface channel quality SINR. The ACK/NACK count and the outer loop value are recorded in each raster cell (where an ACK count and a NACK count are recorded separately). In a space division case, the grid block to which the user data belongs is found according to the RANK, the interference level, the configuration information of the supported maximum modulation order, and the number of scheduled RBs. ACK/NACK information corresponding to actual demodulation and outer loop information are delivered to the raster cell in the grid block according to the scheduled MCS and the air interface channel quality SINR. The ACK/NACK count and the outer loop value are recorded in each raster cell (where an ACK count and a NACK count are recorded separately).

At S94, according to the calculated ACK/NACK count of each raster cell in each grid block, the BLER corresponding to a raster cell and the outer loop value corresponding to the raster cell are calculated. If a sample size of the raster cell is less than a certain threshold, the raster cell is labeled as NULL.

At S95, a demodulation curve is learned according to the BLER and the outer loop value corresponding to each raster cell in each grid block.

In an embodiment, in the grid block, for each MCS, a raster cell whose corresponding BLER satisfies the set BLER range is searched for, so as to determine the air interface measurement value SINR corresponding to the raster cell and the outer loop value corresponding to the raster cell. A model update flag is initialized: Model_change_index=0. A model performance evaluation set AI_ΔSINR_int_set is initialized to be NULL. The following operations S951 to S955 are included.

At S951, if a number of raster cells which satisfy the set BLER range for one MCS is greater than 1, a weight factor of each raster cell is calculated. A calculation method is: calculating a ratio of the number of samples (total ACK/NACK count) contained in the raster cell satisfying the condition to the sum of the numbers of samples of all the raster cells satisfying the condition.

At S952, weighted averaging is performed on the air interface measurement value SINR corresponding to each raster cell and performed on the outer loop value corresponding to each raster cell, according to the weight factors.

At S953, a scheduled MCS which satisfies the target BLER range under the air interface measurement value SINR, and the outer loop value corresponding to the air interface measurement value SINR are determined.

At S954, in response to that no raster cell satisfying the set BLER range is found for an MCS, a SINR range corresponding to a target BLER range on a system reference demodulation curve (which is generally a simulated curve) is searched for the MCS, then a system default initialized outer loop value is subtracted from a median value in the SINR range to obtain an air interface measurement value SINR corresponding to the MCS, and the system default initialized outer loop value is determined as an outer loop value corresponding to the air interface measurement value SINR.

At S955, through the above process, a scheduled MCS which corresponds to each air interface measurement value SINR and which satisfies the target BLER range and the outer loop value corresponding to each air interface measurement value SINR can be determined, i.e., the learning models are:

a model of correspondence between air interface measurement values SINR and scheduled MCSs under the set target BLER range, expressed as $$\text{Model\_Ofline\_Grad}_j^0 =$$

$$\left\{ \left( SINR_i, MCS_i^0 \right) \mid BLER\left( SINR_i, MCS_i^0 \right) \in [0.08, 0.12], i = 1, 2, \cdots, N \right\};$$

a model of correspondence between air interface measurement values SINR and outer loop values ΔSINR under the set target BLER range, expressed as $$\text{Model\_Ofline\_Grad}_j^1 =$$

$$\left\{ \left( SINR_i, \Delta SINR_i^1 \right) \mid BLER\left( SINR_i, \Delta SINR_i^1 \right) \in [0.08, 0.12], i = 1, 2, \cdots, N \right\},$$

where [0.08, 0.12] represents the target BLER range;

$$\left( SINR_i, MCS_i^0 \right)$$

represents a combination of an air interface measurement value SINR satisfying the target BLER range and a scheduled MCS;

$$\left( SINR_i, \Delta SINR_i^1 \right)$$

represents a combination of an air interface measurement value SINR satisfying the target BLER range and an outer loop value; BLER(•) represents a BLER under the corresponding combination;

$$\text{Model\_Ofline\_Grad}_j^0$$

represents an offline learning model of correspondence between the air interface measurement value of a j-th grid block and a scheduled MCS;

$$\text{Model\_Ofline\_Grad}_j^1$$

represents an offline learning model of correspondence between the air interface measurement value SINR of the j-th grid block and an outer loop value; j=1, . . . 64; N represents the number of MCSs which the system can support.

At S96, before the model application, a set of correspondences between SE and air interface measurement values SINR in the network is obtained as:

$$\text{Set\_p}_0 = \{(\text{SINR\_B}_i, SE_i^0) \mid i = 1, 2 \cdots, K_0\},$$

and a proportion R0 of user-specific BLERs falling within the target BLER range before the application of the outer loop initialization model is calculated, where $K_0$ represents the number of sample points, and Set_$p_0$ represents a network performance set before the model application.

At S97, the model is applied.

At S971, according to the feature data corresponding to the user equipment and a grid division policy, the grid block to which the user equipment belongs is determined, and models $$\text{Model\_Ofline\_Grad}_j^0 \text{ and } \text{Model\_Ofline\_Grad}_j^1$$

corresponding to the grid block are obtained.

At S972, according to a current air interface measurement value SINR0 corresponding to the user equipment, a corresponding MCS is determined by the model $$\text{Model\_Ofline\_Grad}_j^0,$$

a median value SINR1 in a SINR range corresponding to the target BLER range is obtained based on the MCS and a system reference BLER curve, and an outer loop value is calculated based on SINR0 and SINR1: D_SINR0=SINR1−SINR0.

At S973, based on the current air interface measurement value SINR corresponding to the user equipment, a corresponding outer loop value D_SINR1 is obtained by the model $$\text{Model\_Ofline\_Grad}_j^1.$$

At S974, an outer loop value to be initialized for the user equipment is calculated as:

$$\text{D\_SINR\_Init} = \min\{\max\{(\text{D\_SINR0} + \text{D\_SINR1})/2, -\text{V\_limt}\}, \text{V\_limt}\},$$

where V_limt represents a protection limit value, which is greater than 0, and is 10 by default.

At S975, it is determined whether the model update flag Model_change_index is TRUE. If yes, AI_ΔSINR_int_set is initialized to be NULL, Model_change_index=0, corresponding demodulation information ACK/NACK when the user equipment is subjected to outer loop by this D_SINR_Init is recorded in AI_ΔSINR_int_set (not recorded for conservative scheduling).

Otherwise, corresponding demodulation information ACK/NACK when the user equipment is subjected to outer loop by this D_SINR_Init is recorded in AI_ΔSINR_int_set (not recorded for conservative scheduling).

At S98, a set of correspondences between SE and air interface measurement values SINR in the network after the model application is obtained as:

$$\text{Set\_p}_1 = \{(SINRA_i^1, SE_i^1) \mid i = 1, 2 \cdots, K_1\},$$

and a proportion R1 of user-specific BLERs falling within the target BLER range after the application of the outer loop initialization model is calculated, where $K_1$ represents the number of sample points, and Set_$p_1$ represents a network performance set after the model application.

At S99, it is determined whether there is an intersection between the air interface channel quality SINRs in the Set_$p_0$ and Set_$p_1$.

At S991, if there is an intersection, a performance difference corresponding to the intersection is calculated, and expressed as $\{D\_SE_i | i=1, 2, \ldots M\}$, where $D\_SE_i$ represents a difference between SE corresponding to an i-th element in the intersection after the model application and SE corresponding to the i-th element in the intersection before the model application.

At S992, a proportion R2 of elements less than 0 in $\{D\_SE_i | i=1, 2, \ldots M\}$, and an average value of the elements in the set are calculated.

At S993, if D_SE_mean≥$Th_0$, $R_2$≥$Th_1$ and $R_0$≥$R_1$, or if D_SE_mean<$Th_0$, S910 is executed.

Otherwise, the current model continues to be used for outer loop initialization for new user equipments which are connected to the network.

At S994, if there is no intersection and $R_0$≥$R_1$, S910 is executed.

Otherwise, the current model continues to be used for outer loop initialization for new user equipments which are connected to the network.

S910, model correction is started.

It is determined whether |AI_ΔSINR_int_set|≥Th_A/N_NUM is TRUE. If yes, a proportion of NACKs is calculated according to the elements in AI_ΔSINR_int_set as: NACK_R; and a model adjustment amount is calculated according to the following relational expression:

$$\delta = \left(1 - \frac{\text{NACK\_R}}{\text{BLER\_tart}}\right)\lambda,$$

where BLER_tart represents a set target BLER, and λ represents a model adjustment step size.

The value of a channel quality dimension in the model $$\text{Model\_Online\_Grad}_j^0$$

is updated using a following equation:

$$SINR_i=\max\{\min(SINR_i-\delta,SINR_i+\beta),SINR_i-\beta\},$$

to obtain a new model $$Model\_Online\_Grad_j^0.$$

The value of the channel quality dimension in the model $$Model\_Online\_Grad_j^1$$

is updated using a a following equation:

$$\Delta SINR_i^1 = \max\{\min(\Delta SINR_i^1 + \delta, \Delta SINR_i^1 + \gamma), SINR_i - \gamma\},$$

to obtain a new model $$Model\_Online\_Grad_j^1.$$

Model_change_index=1 is set, and S97 is executed.

Otherwise, it is determined to skip updating the model, and S97 is executed.

In an embodiment, a method for correcting the online model is provided, including following operations S101 to S10132.

At S101, grid division is performed based on historical feature data.

According to the collected historical feature data of the user equipment in the network, the grid division is performed.

In an embodiment, the historical feature data includes: user transmission mode, scheduled air interface measurement value SINR, space division flag; RANK; a supported maximum modulation order (64QAM, 256QAM); corresponding demodulation ACK/NACK; outer loop information, and the like. The user transmission mode includes: single port, closed-loop multiplexing RI=1, and closed-loop multiplexing RI=2.

In a non-space division case, a cell is divided into 24 grid blocks based on three transmission modes (single port, closed-loop multiplexing RI=1, and closed-loop multiplexing RI=2), two interference levels (high interference and low interference), the supported maximum modulation order (64QAM, 256QAM), and an RB quantity (large and small RBs). In a space division case, a cell is divided into 40 grid blocks based on the RANK (having five possibilities: 2, 3, 4, 5, or greater than or equal to 6), two interference levels (high interference and low interference), the supported maximum modulation order (64QAM, 256QAM), and the RB quantity (large and small RBs). In some examples, the division at the grid block level may further include chip type information of the user equipment, demodulation algorithm information, beam position information of the user equipment, and the like. It should be noted that, the above grid division method is merely an example, and is not intended to limit the present disclosure.

At S102, raster division is performed on each grid block based on a scheduled MCS and a corresponding demodulated air interface measurement value SINR.

For example, a two-dimensional division is performed by taking the MCS with a granularity of one order as a horizontal axis and the SINR value with a granularity of 0.5 dB as the vertical axis.

At S103, according to new captured feature data, a grid block to which the new feature data belongs and a raster cell to which the new feature data belongs in the grid block are determined; and ACK/NACK information corresponding to actual demodulation and outer loop information are delivered to the raster cell in the grid block.

In an embodiment, it is determined according to the captured new feature data whether space division is used. In a non-space division case, the grid block to which the user data belongs is found according to the transmission mode, the interference level, configuration information of the supported maximum modulation order, and the number of scheduled RBs. ACK/NACK information corresponding to actual demodulation and outer loop information are delivered to the raster cell in the grid block according to the scheduled MCS and the air interface measurement value SINR. The ACK/NACK information count and the outer loop value are recorded in each raster cell (where an ACK count and a NACK count are recorded separately).

In a space division case, the grid block to which the user data belongs is found according to the RANK, the interference level, the configuration information of the supported maximum modulation order, and the number of scheduled RBs. ACK/NACK information corresponding to actual demodulation and outer loop information are delivered to the raster cell in the grid block according to the scheduled MCS and the air interface measurement value SINR. The ACK/NACK count and the outer loop value are recorded in each raster cell (where an ACK count and a NACK count are recorded separately).

At S104, a BLER and an outer loop value of each raster cell in each grid block are statistically calculated.

For example, according to the calculated ACK/NACK count of each raster cell in each grid block, the BLER corresponding a raster cell and the outer loop value corresponding to the raster cell are calculated. If a sample size of the raster cell is less than a certain threshold, the raster cell is labeled as NULL.

At S105, a model of correspondence between air interface measurement values SINR and scheduled MCSs and a model of correspondence between air interface measurement values SINR and outer loop values are determined according to the BLER and the outer loop value of each raster cell in each grid block.

In an embodiment, in the grid block, for each MCS, a raster cell whose corresponding BLER satisfies the set BLER range is searched for, so as to determine the air interface measurement value SINR corresponding to the raster cell and the outer loop value corresponding to the raster cell, which includes the following operations S1051 to S1055.

At S1051, if a number of raster cells which satisfy the set BLER range for one MCS is greater than 1, a weight factor of each raster cell is calculated.

A calculation method is: calculating a ratio of the number of samples (total ACK/NACK count) contained in the raster cell satisfying the condition to the sum of the numbers of samples of all the raster cells satisfying the condition.

At S1052, weighted averaging is performed on the air interface measurement value SINR corresponding to each raster cell and performed on the outer loop value corresponding to each raster cell according to the weight factors.

At S1053, a scheduled MCS which satisfies the target BLER range under the air interface measurement value SINR, and the outer loop value corresponding to the air interface measurement value SINR are determined.

At S1054, if no raster cell satisfying the set BLER range is found for an MCS, a demodulated value SINR range corresponding to a target BLER range on a system reference demodulation curve (which is generally a simulated curve) is searched for the MCS, then a system default initialized outer loop value is subtracted from a median value in the SINR range to obtain an air interface measurement value SINR corresponding to the MCS, and the system default initialized outer loop value is determined as an outer loop value corresponding to the air interface measurement value SINR.

At S1055, through the above process, a scheduled MCS which corresponds to each air interface measurement value SINR and which satisfies the target BLER range and the outer loop value corresponding to each air interface measurement value SINR can be determined, i.e., the learning models are:

a model of correspondence between air interface measurement values SINR and scheduled MCSs under the set target BLER range, expressed as $$\text{Model\_Ofline\_Grad}_j^0 =$$

$$\left\{\left(SINR_i, MCS_i^0\right) \mid BLER\left(SINR_i, MCS_i^0\right) \in [0.08, 0.12], i = 1, 2, \cdots, N\right\};$$

a model of correspondence between air interface measurement values SINR and outer loop values ΔSINR under the set target BLER range, expressed as $$\text{Model\_Ofline\_Grad}_j^1 =$$

$$\left\{\left(SINR_i, \Delta SINR_i^1\right) \mid BLER\left(SINR_i, \Delta SINR_i^1\right) \in [0.08, 0.12], i = 1, 2, \cdots, N\right\},$$

where [0.08, 0.12] represents the target BLER range;

$$\left(SINR_i, MCS_i^0\right)$$

represents a combination of an air interface measurement value satisfying the target BLER range and a scheduled MCS;

$$\left(SINR_i, \Delta SINR_i^1\right)$$

represents a combination of an air interface measurement value satisfying the target BLER range and an outer loop value; BLEB(•) represents a BLER under the corresponding combination;

$$\text{Model\_Ofline\_Grad}_j^0$$

represents an offline learning model of correspondence between the air interface measurement value of a j-th grid block and a scheduled MCS;

$$\text{Model\_Ofline\_Grad}_j^1$$

represents an offline learning model of correspondence between the air interface measurement value SINR of the j-th grid block and an outer loop value; j=1, . . . 64; N represents the number of MCSs which the system can support.

At S106, a set of correspondences between SE and average air interface measurement values SINR in the network before the application of the outer loop initialization model is obtained as:

$$\text{Set\_p}_0 = \left\{\left(SINR\_B_i, SE_i^0\right) \mid i = 1, 2 \cdots, K_0\right\},$$

and a proportion R0 of user-specific BLERs falling within the target BLER range before the application of the outer loop initialization model is calculated, where $K_0$ represents the number of sample points, and Set_$p_0$ represents a network performance set before the model application.

At S107, the outer loop initialization model is applied.

At S1071, according to the feature data corresponding to the user equipment and a grid division policy, the grid block to which the user equipment belongs is determined, and models $$\text{Model\_Ofline\_Grad}_j^0 \text{ and Model\_Ofline\_Grad}_j^1$$

corresponding to the grid block are obtained.

At S1072, according to a current air interface measurement value SINR0 corresponding to the user equipment, a corresponding MCS is determined by the model $$\text{Model\_Ofline\_Grad}_j^0,$$

a median value SINR1 in a SINR range corresponding to the target BLER range is obtained based on the MCS and a system reference BLER curve, and an outer loop value is calculated based on SINR0 and SINR1: D_SINR0=SINR1−SINR0.

At S1073, based on the current air interface measurement value SINR corresponding to the user equipment, a corresponding outer loop value D_SINR1 is obtained by the model $$\text{Model\_Ofline\_Grad}_j^1.$$

At S1074, an outer loop value to be initialized for the user equipment is calculated as:

$$D\_\text{SINR\_Init}=\min\{\max\{(D\_\text{SINR0}+D\_\text{SINR1})/2,-V\_\text{limt}\},V\_\text{limt}\},$$

where V_limt represents a protection limit value, which is greater than 0, and is 10 by default.

At S1010, a set of correspondences between SE and air interface measurement values SINR in the network after the model application is obtained as:

$$Set\_p_1 = \{(SINRA_i^1, SE_i^1) \mid i = 1, 2 \cdots, K_1\},$$

and a proportion R1 of user-specific BLERs falling within the target BLER range after the application of the outer loop initialization model is calculated, where $K_1$ represents the number of sample points, and $Set\_p_1$ represents a network performance set after the model application.

At S109, it is determined whether there is an intersection between the air interface channel quality SINRs in the $Set\_p_0$ and $Set\_p_1$.

At S1091, if there is an intersection, a performance difference corresponding to the intersection is calculated, and expressed as $$\{D\_SE_i \mid i = 1, 2, \cdots M\},$$

where $D\_SE_i$ represents a difference between SE corresponding to an i-th element in the intersection after the model application and SE corresponding to the i-th element in the intersection before the model application.

At S10911, a proportion R2 of elements less than 0 in $\{D\_SE_i \mid i=1, 2, \ldots M\}$, and an average value of the elements in the set are calculated.

At S10912, if $D\_SE\_mean \geq Th_0$, $R_2 \geq Th_1$ and $R_0 \geq R_1$, or if $D\_SE\_mean < Th_0$, S1010 is executed. Otherwise, the current model continues to be used for outer loop initialization for new user equipments which are connected to the network.

At S1092, when there is no intersection, if $R_0 \geq R_1$, S1010 is executed; otherwise, the current model continues to be used for outer loop initialization for new user equipments which are connected to the network.

At S1010, the application of the current model is stopped, and online learning is started.

At S10101, user-specific data related to scheduling information is collected online, including: user transmission modes including single port, closed-loop multiplexing RI=1, and closed-loop multiplexing RI=2; interference level; scheduled MCS; quantity of allocated RBs; air interface measurement value SINR; space division flag; RANK; a supported maximum modulation order (64QAM, 256QAM); corresponding demodulation ACK/NACK; and outer loop information. A model update flag is initialized as: Model_change_index=0. A model performance evaluation set AI_ΔSINR_int_set is initialized to be NULL.

At S10102, grid division is performed using an appropriate segmentation point selected according to the distribution of feature data used for grid division in the current cell, for example, selecting 50% of quantiles of the distribution as a threshold.

At S10103, under the grid block-level set target BLER range [0.08, 0.12], a model of correspondence between air interface measurement values SINR and scheduled MCSs, expressed as $$Model\_Online\_Grad_j^0 =$$

$$\{(SINR_i, MCS_i^0) \mid BLER(SINR_i, MCS_i^0) \in [0.08, 0.12], i = 1, 2, \cdots, N\},$$

and a model of correspondence between air interface measurement values SINR and outer loop values ΔSINR, expressed as $$Model\_Online\_Grad_j^1 =$$

$$\{(SINR_i, \Delta SINR_i^1) \mid BLER(SINR_i, \Delta SINR_i^1) \in [0.08, 0.12], i = 1, 2, \ldots, N\}$$ are learning through S102 to S106, where [0.08, 0.12] represents the target BLER range;

$$(SINR_i, MCS_i^0)$$

represents a combination of an air interface measurement value satisfying the target BLER range and a scheduled MCS;

$$(SINR_i, \Delta SINR_i^1)$$

represents a combination of an air interface measurement value satisfying the target BLER range and an outer loop value; BLER(•) represents a BLER under the corresponding combination;

$$Model\_Online\_Grad_j^0$$

represents a model of correspondence between the air interface measurement value of a j-th grid block and a scheduled MCS;

$$Model\_Online\_Grad_j^1$$

represents a model of correspondence between the air interface measurement value of the j-th grid block and an outer loop value; j=1, ... 64; N represents the number of MCSs which the system can support.

At S1011, the online model is applied.

At S10111, according to the feature data corresponding to the user equipment and a grid division policy, the grid block to which the user equipment belongs is determined, and models $$Model\_Online\_Grad_j^0 \text{ and } Model\_Online\_Grad_j^1$$

corresponding to the grid block are obtained.

At S10112, according to a current air interface measurement value SINR0 corresponding to the user equipment, a corresponding MCS is determined by the model $$Model\_Ofline\_Grad_j^0,$$

a median value SINR1 in a SINR range corresponding to the target BLER range is obtained based on the MCS and a system reference BLER curve, and an outer loop value is calculated based on SINR0 and SINR1: D_SINR0=SINR1−SINR0.

At S10113, based on the current air interface measurement value SINR corresponding to the user equipment, a corresponding outer loop value D_SINR1 is obtained by the model $$Model\_Online\_Grad_j^1.$$

At S10114, an outer loop value to be initialized for the user equipment is calculated as:

$$D\_SINR\_Init = min\{max\{(D\_SINR0 + D\_SINR1)/2, -V\_limt\}, V\_limt\},$$

where V_limt represents a protection limit value, which is greater than 0, and is 10 by default.

At S1012, a set of correspondences between SE and average air interface measurement values SINR in the network after the model application is obtained as:

$$Set\_p_1 = \{(SINRA_i^1, SE_i^1) \mid i = 1, 2 \cdots, K_1\},$$

and a proportion R1 of user-specific BLERs falling within the target BLER range after the application of the outer loop initialization model is calculated, where $K_1$ represents the number of sample points, and $Set\_p_i$ represents a network performance set after the model application.

At S1013, it is determined whether there is an intersection between the air interface channel quality SINRs in the $Set\_p_0$ and $Set\_p_1$.

At S10131, if there is an intersection, a performance difference corresponding to the intersection is calculated, and expressed as $\{D\_SE_i|i=1, 2, \ldots M\}$, where $D\_SE_i$ represents a difference between SE corresponding to an i-th element in the intersection after the model application and SE corresponding to the i-th element in the intersection before the model application.

At S101311, a proportion R2 of elements less than 0 in $\{D\_SE_i|i=1, 2, \ldots M\}$, and an average value of the elements in the set are calculated.

At S101312, if $D\_SE\_mean \geq Th_0$, $R_2 \geq Th_1$ and $R_0 \geq R_1$, or if $D\_SE\_mean < Th_0$, a default outer loop of the cell is used, and the application of the model is stopped. Otherwise, the current model continues to be used for outer loop initialization for new user equipments which are connected to the network.

At S10132, when there is no intersection, if $R_0 \geq R_1$, the default outer loop of the cell is used, and the application of the model is stopped; otherwise, the current model continues to be used for outer loop initialization for new user equipments which are connected to the network.

Figures 10, 11:
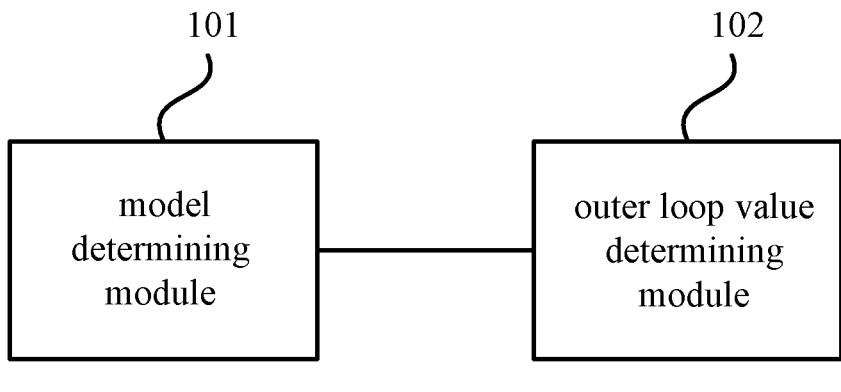
FIG. 10 is a schematic structural diagram of an apparatus for determining an outer loop value according to an embodiment of the present disclosure.
FIG. 11 is a schematic structural diagram of a device according to the present disclosure.

In an embodiment, the present disclosure provides an apparatus for determining an outer loop value. FIG. 10 is a schematic structural diagram of an apparatus for determining an outer loop value according to an embodiment of the present disclosure. This embodiment can be applied to an AMC technology. The apparatus can be implemented by software and/or hardware.

As shown in FIG. 10, the apparatus for determining an outer loop value provided in the embodiment of the present disclosure mainly includes a model determining module 101 and an outer loop value determining module 102.

The model determining module 101 is configured for determining a pre-trained outer loop initialization model based on current feature data of a user equipment.

The outer loop value determining module 102 is configured for determining an initialized outer loop value of the user equipment based on a current air interface measurement value of the user equipment and the outer loop initialization model. The outer loop initialization model includes a first outer loop model and a second outer loop model.

In an implementation, the model determining module 101 is configured for: determining a grid block to which the user equipment belongs based on the current feature data of the user equipment and a grid division policy; and obtaining the first outer loop model and the second outer loop model corresponding to the grid block to which the user equipment belongs.

In an implementation, the outer loop value determining module 102 is configured for: determining a first outer loop value based on the current air interface measurement value and the first outer loop model; determining a second outer loop value based on the current air interface measurement value and the second outer loop model; and determining the initialized outer loop value based on the first outer loop value and the second outer loop value.

In an implementation, determining a first outer loop value based on the current air interface measurement value and the first outer loop model includes: determining a Modulation and Coding Scheme (MCS) corresponding to the current air interface measurement value based on the current air interface measurement value and the first outer loop model, where the first outer loop model is a model of correspondence between air interface measurement values and MCSs under a set target Block Error Rate (BLER) range; obtaining a system mapping SINR corresponding to the target BLER based on the determined MCS and a reference demodulation curve; and determining a difference between the system mapping SINR and the current air interface measurement value as the first outer loop value.

In an implementation, determining a second outer loop value based on the current air interface measurement value and the second outer loop model includes: obtaining the second outer loop value through the second outer loop model based on the current air interface measurement value, where the second outer loop model is a model of correspondence between air interface measurement values and outer loop values under a set target BLER range.

In an implementation, the apparatus further includes: a model training module, configured for, before the pre-trained outer loop initialization model is determined based on the current feature data of the user equipment, training the outer loop initialization model based on historical feature data of the user equipment.

In an implementation, the model training module is configured for: performing raster division based on the historical feature data; determining an Acknowledge/Non-Acknowledge (ACK/NACK) information count and an outer loop value in each raster cell; calculating a BLER of each raster cell based on the ACK/NACK information count in each raster cell; and determining the outer loop initialization model based on the BLER and the outer loop value of each raster cell.

In an implementation, performing raster division based on the historical feature data includes: performing grid division on each cell in a network based on the historical feature data;

and performing raster division on each grid block based on a scheduled MCS and a corresponding air interface measurement value.

In an implementation, determining an ACK/NACK information count includes: obtaining ACK/NACK information corresponding to the demodulation; delivering the ACK/NACK information and corresponding outer loop information to a respective corresponding raster cell; and calculating the ACK/NACK information count and the outer loop value in each raster cell.

In an implementation, determining the outer loop initialization model based on the BLER and the outer loop value of each raster cell includes: determining MCSs corresponding to air interface measurement values under a set target BLER range and outer loop values corresponding to the air interface measurement values, based on the BLER of each raster cell in each grid block; determining a first outer loop model based on a correspondence between the air interface measurement values and the MCSs; and determining a second outer loop model based on a correspondence between the air interface measurement values and the outer loop values.

In an implementation, determining MCSs corresponding to air interface measurement values under a set target BLER range and outer loop values corresponding to the air interface measurement values based on the BLER of each raster cell includes: for an MCS, if a number of raster cells which satisfy the set target BLER range is greater than a preset value, calculating a weight factor of each raster cell; performing weighted averaging on the air interface measurement values corresponding to the raster cells based on the weight factor of each raster cell, to obtain an air interface measurement value corresponding to the MCS; performing weighted averaging on the outer loop values corresponding to the raster cells based on the weight factor of each raster cell, to obtain an outer loop value corresponding to the MCS; and determining the outer loop value corresponding to the air interface measurement value according to the air interface measurement value corresponding to the MCS and the outer loop value corresponding to the MCS.

In an implementation, determining MCSs corresponding to air interface measurement values under a set target BLER range and outer loop values corresponding to the air interface measurement values based on the BLER of each raster cell includes: for an MCS, if a number of raster cells which satisfy the set target BLER range is less than a preset value, searching for an air interface measurement value range corresponding to the target BLER range corresponding to the MCS on a reference demodulation curve; determining a difference between a median value in the found air interface measurement value range and a system default initialized outer loop value as an air interface measurement value corresponding to the MCS; and determining the system default initialized outer loop value as the outer loop value corresponding to the air interface measurement value.

In an implementation, the apparatus further includes: an online model learning module, configured for: after the initialized outer loop value of the user equipment is determined based on the current air interface measurement value of the user equipment and the outer loop initialization model, obtaining a first network performance indicator before model application and a second network performance indicator after the outer loop initialization model is applied; starting online learning to obtain an online outer loop model, if the first network performance indicator and the second network performance indicator satisfy a preset condition;

and determining a new initialized outer loop value of the user equipment by utilizing the online outer loop model.

In an implementation, the apparatus further includes: an online model adjustment module, configured for correcting an outer loop model of a corresponding grid block based on ACK/NACK information of the user equipment in a grid block after the user equipment uses an outer loop model for a first time, where the outer loop model includes an outer loop initialization model or an online outer loop model.

In an implementation, correcting an outer loop model of a corresponding grid block based on ACK/NACK information of a user equipment after the user equipment uses an outer loop model includes: calculating a proportion of NACKs in ACK/NACK information for each grid block; decreasing an outer loop value of the outer loop model according to a corresponding policy if the proportion of NACKs is greater than a target value; and increasing the outer loop value of the outer loop model according to a corresponding policy if the proportion of NACKs is less than the target value.

The apparatus for determining an outer loop value provided in this embodiment can execute the method for determining an outer loop value provided in any embodiment of the present disclosure, and has corresponding functional modules to execute the method and beneficial effects of the method. For technical details which are not described in detail in this embodiment, reference can be made to the method for determining an outer loop value provided in any embodiment of the present disclosure.

It should be noted that the units and modules included in the above embodiments of the apparatus for determining an outer loop value are divided according to functional logic only, but are not limited to the above division, as long as the corresponding functions can be realized. In addition, the specific names of the functional units are merely for the convenience of distinguishing from each other, and are not intended to limit the protection scope of the present disclosure.

An embodiment of the present disclosure provides a device. FIG. 11 is a schematic structural diagram of a device according to the present disclosure. As shown in FIG. 11, the device includes a processor 111, a memory 112, an input apparatus 113, and an output apparatus 114. The device include one or more processors 111, although FIG. 11 uses one processor 111 as an example. The processor 111, the memory 112, the input apparatus 113, and the output apparatus 114 is connected by a bus or in other ways. Connection by a bus is taken as an example in FIG. 11.

The memory 112, as a computer-readable storage medium, may be configured for storing a software program, a computer-executable program, and modules, for example, program instructions/modules corresponding to the method for determining an outer loop value in the embodiments of the present disclosure (such as the model determining module 101 and the outer loop value determining module 102 in the apparatus for determining an outer loop value). The software programs, instructions, and modules stored in the memory 112, when executed by the processor 111, cause the processor 111 to executes various functional applications and data processing of the device, i.e., implements any method provided in the embodiments of the present disclosure.

The memory 112 may mainly include a program storage area and a data storage area. The program storage area may store an operating system, and an application required by at least one function. The data storage area may store data created according to the use of the device and the like. In addition, the memory 112 may include a high-speed random access memory, and may also include a nonvolatile memory, e.g., at least one magnetic disk storage device, flash memory device, or other nonvolatile solid-state storage device. In some examples, the memory 112 may further include memories located remotely from the processor 111, and the remote memories may be connected to the device via a network. Examples of the network include, but are not limited to, the Internet, an intranet, a local area network, a mobile communication network, and combinations thereof.

The input apparatus 113 may be configured for receiving an input of numerical or character information, and generating a key signal input related to user settings and function control of the device. The output apparatus 114 may include a display device such as a display screen.

An embodiment of the present disclosure provides a storage medium containing computer-executable instructions which, when executed by a processor of a computer, cause the processor to implement a method for determining an outer loop value. the method includes:

determining a pre-trained outer loop initialization model based on current feature data of a user equipment;

determining an initialized outer loop value of the user equipment based on a current air interface measurement value of the user equipment and the outer loop initialization model.

In the storage medium containing the computer-executable instructions which is provided in the embodiments of the present disclosure, the computer-executable instructions, when executed by the processor, may cause the processor to implement not only the above operations, but also related operations in the method for determining an outer loop value which is provided in any one of the embodiments of the present disclosure.

According to the method and apparatus for determining an outer loop value, the device and the storage medium which are provided in the embodiments of the present disclosure, a technical scheme of determining a pre-trained outer loop initialization model based on current feature data of a user equipment and determining an initialized outer loop value of the user equipment based on a current air interface measurement value of the user equipment and the outer loop initialization model is adopted, to address the problem of resource waste and user perception degradation caused by small packet user not converging and increase the convergence speed of the AMC technology.

From the above detailed description of the embodiments, those having ordinary skills in the art can understand that the present disclosure can be implemented by software and necessary general-purpose hardware, and can also be implemented by hardware, but in many cases, the former is a better implementation. Based on such an understanding, the technical schemes of the present disclosure essentially or the part contributing to technologies in the art may be embodied in the form of a software product. The computer software product may be stored in a computer-readable storage medium such as a floppy disk, a Read-Only Memory (ROM), a Random Access Memory (RAM), a flash memory, a hard disk, an optical disc, and the like of a computer, and containing instructions for instructing a computer device (which may be a personal computer, a server, a network device, or the like) to execute the methods described in the embodiments of the present disclosure.

The above description is only example embodiments of the present disclosure, and is not intended to limit the scope of the present disclosure.

As will be understood by those having ordinary skills in the art, the term "user terminal" encompasses any suitable type of wireless user equipment, such as a mobile telephone, portable data processing device, portable web browser or vehicle-mounted mobile station.

In general, the various embodiments of the present disclosure may be implemented in hardware or application-specific circuits, software, logic, or any combination thereof. For example, some embodiments may be implemented in hardware, while other embodiments may be implemented in firmware or software which can be executed by a controller, microprocessor or other computing device, but the present disclosure is not limited thereto.

The embodiments of the present disclosure may be implemented by the execution of computer program instructions by a data processor of a mobile device, for example, in a processor entity, or by hardware, or by a combination of software and hardware. The computer program instructions may be assembly instructions, Instruction Set Architecture (ISA) instructions, machine instructions, machine dependent instructions, microcode, firmware instructions, state setting data, or source code or object code written in any combination of one or more programming languages.

The block diagram of any logic flow in the accompanying drawings of the present disclosure may represent program steps, or may represent interconnected logic circuits, modules and functions, or may represent a combination of program steps and logic circuits, modules and functions. The computer program may be stored in a memory. The memory may be of any type suitable for the local technical environment and may be implemented using any suitable data storage technology, such as, but not limited to, Read-Only Memory (ROM), Random Access Memory (RAM), and optical storage devices and systems (Digital Versatile Disc (DVD) or compact disk (CD)), etc. The computer-readable medium may include a non-transitory storage medium. The data processor may be of any type suitable for the local technical environment, such as, but not limited to, a general-purpose computer, a special-purpose computer, a micropro-cessor, a Digital Signal Processor (DSP), an Application Specific Integrated Circuit (ASIC), a programmable logic device (Field-Programmable Gate Array (FPGA)), and a processor based on a multi-core processor architecture.

A detailed description of the present disclosure is provided by way of example and non-limiting embodiments. However, various modifications and adjustments made to the above embodiments could be apparent to those having ordinary skills in the art in light of the accompanying drawings and the appended claims, and do not depart from the scope of the present disclosure. Therefore, the proper scope of the present disclosure will be defined by the appended claims.

What is claimed is:

1. A method for determining an outer loop value performed by a data processor of a mobile device, comprising:

determining a pre-trained outer loop initialization model based on current feature data of a user equipment, wherein the pre-trained outer loop initialization model comprises a first outer loop model and a second outer loop model, the first outer loop model is a model of correspondence between air interface measurement values and Modulation and Coding Schemes (MCSs) under a set target Block Error Rate (BLER) range, and the second outer loop model is a model of correspondence between air interface measurement values and outer loop values under a set target BLER range;

determining an initialized outer loop value of the user equipment based on a current air interface measurement value of the user equipment and the pre-trained outer loop initialization model; and applying the initialized outer loop value to Adaptive Modulation and Coding (AMC).

2. The method of claim 1, wherein determining a pre-trained outer loop initialization model based on current feature data of a user equipment comprises:

determining, based on the current feature data of the user equipment and a grid division policy, a grid block to which the user equipment belongs; and obtaining the first outer loop model and the second outer loop model corresponding to the grid block to which the user equipment belongs.

3. The method of claim 2, wherein determining an initialized outer loop value of the user equipment based on a current air interface measurement value of the user equipment and the pre-trained outer loop initialization model comprises:

determining a first outer loop value based on the current air interface measurement value and the first outer loop model;

determining a second outer loop value based on the current air interface measurement value and the second outer loop model; and determining the initialized outer loop value based on the first outer loop value and the second outer loop value.

4. The method of claim 3, wherein determining a first outer loop value based on the current air interface measurement value and the first outer loop model comprises:

determining a Modulation and Coding Scheme (MCS) corresponding to the current air interface measurement value based on the current air interface measurement value and the first outer loop model;

obtaining a system mapping Interference plus Noise Ratio (SINR) corresponding to the target BLER based on the determined MCS and a reference demodulation curve; and determining a difference between the system mapping SINR and the current air interface measurement value as the first outer loop value.

5. The method of claim 3, wherein determining a second outer loop value based on the current air interface measurement value and the second outer loop model comprises:

obtaining the second outer loop value through the second outer loop model based on the current air interface measurement value.

6. The method of claim 1, wherein prior to determining a pre-trained outer loop initialization model based on current feature data of a user equipment, the method further comprises:

training the pre-trained outer loop initialization model based on historical feature data of the user equipment.

7. The method of claim 6, wherein training the pre-trained outer loop initialization model based on historical feature data of the user equipment comprises:

performing raster division based on the historical feature data;

determining an Acknowledge/Non-Acknowledge (ACK/NACK) information count and an outer loop value in each raster cell;

calculating a BLER of each raster cell based on the ACK/NACK information count in each raster cell; and determining the pre-trained outer loop initialization model based on the BLER and the outer loop value of each raster cell.

8. The method of claim 7, wherein performing raster division based on the historical feature data comprises:

performing grid division on each cell in a network based on the historical feature data; and performing raster division on each grid block based on a scheduled MCS and a corresponding air interface measurement value.

9. The method of claim 7, wherein determining an ACK/NACK information count and an outer loop value in each raster cell comprises:

obtaining ACK/NACK information corresponding to demodulation;

delivering the ACK/NACK information and corresponding outer loop information to the corresponding raster cell; and calculating the ACK/NACK information count and the outer loop value in each raster cell.

10. The method of claim 7, wherein determining the pre-trained outer loop initialization model based on the BLER and the outer loop value of each raster cell comprises:

determining MCSs corresponding to air interface measurement values under a set target BLER range and outer loop values corresponding to the air interface measurement values based on the BLER of each raster cell in each grid block;

determining a first outer loop model based on a correspondence between the air interface measurement values and the MCSs; and determining a second outer loop model based on a correspondence between the air interface measurement values and the outer loop values.

11. The method of claim 10, wherein determining MCSs corresponding to air interface measurement values under a set target BLER range and outer loop values corresponding to the air interface measurement values based on the BLER of each raster cell comprises:

for an MCS, in response to a number of raster cells which satisfy the set target BLER range being greater than a preset value, calculating a weight factor of each raster cell according to the ACK/NACK information count in each raster cell;

performing weighted averaging on the air interface measurement values corresponding to the raster cells based on the weight factor of each raster cell, to obtain an air interface measurement value corresponding to the MCS;

performing weighted averaging on the outer loop values corresponding to the raster cells based on the weight factor of each raster cell, to obtain an outer loop value corresponding to the MCS; and determining the outer loop value corresponding to the air interface measurement value according to the air interface measurement value corresponding to the MCS and the outer loop value corresponding to the MCS.

12. The method of claim 10, wherein determining MCSs corresponding to air interface measurement values under a set target BLER range and outer loop values corresponding to the air interface measurement values based on the BLER of each raster cell comprises:

for an MCS, in response to a number of raster cells which satisfy the set target BLER range being less than a preset value, searching for an air interface measurement value range corresponding to the target BLER range corresponding to the MCS on a reference demodulation curve;

determining a difference between a median value in the found air interface measurement value range and a system default initialized outer loop value as an air interface measurement value corresponding to the MCS; and determining the system default initialized outer loop value as the outer loop value corresponding to the air interface measurement value.

13. The method of claim 1, wherein after determining an initialized outer loop value of the user equipment based on a current air interface measurement value of the user equipment and the pre-trained outer loop initialization model, the method further comprises:

obtaining a first network performance indicator before model application and a second network performance indicator after the pre-trained outer loop initialization model is applied;

in response to the first network performance indicator and the second network performance indicator satisfying a preset condition, starting online learning to obtain an online outer loop model; and determining a new initialized outer loop value of the user equipment by utilizing the online outer loop model.

14. The method of claim 13, further comprising:

correcting an outer loop model of a corresponding grid block based on ACK/NACK information of the user equipment in a grid block after the user equipment uses an outer loop model for a first time, wherein the outer loop model comprises a pre-trained outer loop initialization model or an online outer loop model.

15. The method of claim 1, further comprising:

correcting an outer loop model of a corresponding grid block based on ACK/NACK information of the user equipment in a grid block after the user equipment uses an outer loop model for a first time, wherein the outer loop model comprises a pre-trained outer loop initialization model or an online outer loop model.

16. The method of claim 15, wherein correcting an outer loop model of a corresponding grid block based on ACK/NACK information of the user equipment in a grid block after the user equipment uses an outer loop model for a first time comprises:

calculating a proportion of NACKs in ACK/NACK information for each grid block;

in response to the proportion of NACKs being greater than a target value, decreasing an outer loop value of the outer loop model according to a corresponding policy; and in response to the proportion of NACKs being less than the target value, increasing the outer loop value of the outer loop model according to a corresponding policy.

17. A device, comprising:

at least one processor; and a memory, configured for storing at least one program, wherein:

the at least one program, when executed by the at least one processor, causes the at least one processor to perform a method for determining an outer loop value comprising:

determining a pre-trained outer loop initialization model based on current feature data of a user equipment, wherein the pre-trained outer loop initialization model comprises a first outer loop model and a second outer loop model, the first outer loop model is a model of correspondence between air interface measurement values and Modulation and Coding Schemes (MCSs) under a set target Block Error Rate (BLER) range, and the second outer loop model is a model of correspondence between air interface measurement values and outer loop values under a set target BLER range;

determining an initialized outer loop value of the user equipment based on a current air interface measurement value of the user equipment and the pre-trained outer loop initialization model; and applying the initialized outer loop value to Adaptive Modulation and Coding (AMC).

* * * * *